US012431062B2

(12) United States Patent
Yoo et al.

(10) Patent No.: US 12,431,062 B2
(45) Date of Patent: Sep. 30, 2025

(54) DISPLAY DEVICE AND METHOD OF OPERATING THE SAME

(71) Applicant: Samsung Display Co., Ltd., Yongin-Si (KR)

(72) Inventors: Byoung Seok Yoo, Yongin-si (KR); Seungho Park, Yongin-si (KR); Seyun Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/599,222

(22) Filed: Mar. 8, 2024

(65) Prior Publication Data

US 2024/0420619 A1 Dec. 19, 2024

(30) Foreign Application Priority Data

Jun. 16, 2023 (KR) ........................ 10-2023-0077665

(51) Int. Cl.
*G09G 3/20* (2006.01)

(52) U.S. Cl.
CPC ......... *G09G 3/2096* (2013.01); *G09G 3/2007* (2013.01); *G09G 2320/02* (2013.01); *G09G 2330/021* (2013.01); *G09G 2360/16* (2013.01)

(58) Field of Classification Search
CPC ............... G09G 3/2007; G09G 3/2096; G09G 2320/02; G09G 2330/021; G09G 2360/16
See application file for complete search history.

(56) References Cited

U.S. PATENT DOCUMENTS 6,844,883 B2 * 1/2005 Bakhmutsky ............ H04N 9/68 348/E9.053
10,068,516 B2 9/2018 Choi et al.
11,282,478 B2 * 3/2022 Yoo .......................... G09G 5/10
2002/0196264 A1 * 12/2002 Goetz .................... H04N 17/04 345/611
2012/0169780 A1 7/2012 Park et al.
2013/0201205 A1 8/2013 Jung et al.

FOREIGN PATENT DOCUMENTS

KR 10-2012-0077751 A 7/2012
KR 10-2013-0090236 A 8/2013

* cited by examiner

*Primary Examiner* — Gene W Lee
(74) *Attorney, Agent, or Firm* — Innovation Counsel LLP

(57) ABSTRACT

A display device is disclosed that includes a display panel, a memory storing compensation signals respectively corresponding to blocks of the display panel, and a driving controller receiving an input image signal, compensating for the input image signal based on the compensation signals, and outputting an output image signal. The driving controller includes first to fourth memories storing the compensation signals from the memory. The compensation signals stored in the memory include first row compensation signals corresponding to blocks disposed at a first row among the blocks and second row compensation signals corresponding to blocks disposed at a second row among the blocks. Some of the first row compensation signals are stored in the first memory, and the others thereof are stored in the second memory. Some of the second row compensation signals are stored in the third memory, and the others thereof are stored in the fourth memory.

19 Claims, 29 Drawing Sheets

FIG. 5

CCb

| | | | | | | |
|---|---|---|---|---|---|---|
| C11 | C12 | C13 | C14 | C15 | C16 | C17 |
| C21 | C22 | C23 | C24 | C25 | C26 | C27 |
| C31 | C32 | C33 | C34 | C35 | C36 | C37 |
| C41 | C42 | C43 | C44 | C45 | C46 | C47 |
| C51 | C52 | C53 | C54 | C55 | C56 | C57 |
| C61 | C62 | C63 | C64 | C65 | C66 | C67 |

FIG. 6

| R | C11_R |
|---|---|
| 0 | a0 |
| 80 | a1 |
| 162 | a2 |
| 250 | a3 |
| 425 | a4 |
| 512 | a5 |
| 591 | a6 |
| ⋮ | ⋮ |
| 7937 | a92 |
| 8021 | a93 |
| 8106 | a94 |
| 8191 | a95 |

| G | C11_G |
|---|---|
| 0 | b0 |
| 65 | b1 |
| 160 | b2 |
| 235 | b3 |
| 417 | b4 |
| 502 | b5 |
| 588 | b6 |
| ⋮ | ⋮ |
| 7940 | b92 |
| 8025 | b93 |
| 8100 | b94 |
| 8191 | b95 |

| B | C11_B |
|---|---|
| 0 | c0 |
| 77 | c1 |
| 158 | c2 |
| 244 | c3 |
| 425 | c4 |
| 522 | c5 |
| 599 | c6 |
| ⋮ | ⋮ |
| 7900 | c92 |
| 8033 | c93 |
| 8111 | c94 |
| 8191 | c95 |

C11_R, C11_G, C11_B } C11

DISPLAY DEVICE AND METHOD OF OPERATING THE SAME

CROSS-REFERENCE TO RELATED APPLICATIONS

This application claims priority under 35 U.S.C. § 119 to Korean Patent Application No. 10-2023-0077665 filed on Jun. 16, 2023, in the Korean Intellectual Property Office, the disclosures of which are incorporated by reference herein in their entireties.

BACKGROUND

Embodiments of the present disclosure relate to a display device.

A display device includes a display panel including a plurality of pixels. Each of the plurality of pixels may provide one of various color lights such as a red light, a green light, and a blue light.

A desired image may be displayed by adjusting an emission level of each of the plurality of pixels. The size of each of the plurality of pixels and a way to arrange the plurality of pixels may be variously determined.

SUMMARY

Embodiments of the present disclosure may provide a display device capable of compensating for the degradation of image quality according to a characteristic of a display panel.

According to an embodiment, a display device includes a display panel, a memory that stores a plurality of compensation signals respectively corresponding to a plurality of blocks of the display panel, and a driving controller that receives an input image signal, compensates for the input image signal based on the plurality of compensation signals, and outputs an output image signal. The driving controller includes a first to a fourth memory that stores the plurality of compensation signals from the memory, and a compensation unit that compensates for the input image signal based on first to fourth compensation signals respectively provided from the first to fourth memories and outputs the output image signal. The plurality of compensation signals stored in the memory include first row compensation signals corresponding to blocks disposed at a first row from among the plurality of blocks and second row compensation signals corresponding to blocks disposed at a second row from among the plurality of blocks. Some of the first row compensation signals are stored in the first memory, the others of the first row compensation signals are stored in the second memory, some of the second row compensation signals are stored in the third memory, and the others of the second row compensation signals are stored in the fourth memory.

In an embodiment, the compensation unit may simultaneously read the first to fourth compensation signals from the first to fourth memories.

In an embodiment, odd-numbered first row compensation signals among the first row compensation signals may be stored in the first memory, and even-numbered first row compensation signals among the first row compensation signals may be stored in the second memory. Odd-numbered second row compensation signals among the second row compensation signals may be stored in the third memory, and even-numbered second row compensation signals among the second row compensation signals may be stored in the fourth memory.

In an embodiment, the compensation unit may include a first correction value calculator that outputs first to fourth correction signals corresponding to the input image signal based on the first to fourth compensation signals, a second correction value calculator that outputs a final compensation signal based on the first to fourth correction signals, and a compensator that compensates for the input image signal based on the final compensation signal and outputs the output image signal.

In an embodiment, the second correction value calculator may output the final compensation signal by a bilinear interpolation method, based on the first to fourth correction signals.

In an embodiment, each of the first to fourth compensation signals may include first compensation values for a first image signal, second compensation values for a second image signal, and third compensation values for a third image signal.

In an embodiment, each of the first to fourth memories may include a first and a second sub-memory that stores the first compensation values, a third and a fourth sub-memory that stores the second compensation values, and a fifth and a sixth sub-memory that stores the third compensation values.

In an embodiment, odd-numbered first compensation values among the first compensation values may be stored in the first sub-memory, and even-numbered first compensation values among the first compensation values may be stored in the second sub-memory.

In an embodiment, the first image signal may correspond to a first color, and the first compensation values may respectively correspond to a plurality of gray levels of the first color.

In an embodiment, the first correction value calculator may output the first correction signal corresponding to the first color of the first image signal based on one of the odd-numbered first compensation values stored in the first sub-memory and one of the even-numbered first compensation values stored in the second sub-memory.

In an embodiment, the display device may further include a fifth memory that stores one of the plurality of compensation signals as a reference compensation signal, and the first to fourth memories may store difference values of the reference compensation signal and the plurality of compensation signals from the memory.

In an embodiment, a sum of respective sizes of the first to fourth memories may be smaller than a size of the memory.

According to an embodiment, a display device includes a display panel, a memory that stores a plurality of compensation signals respectively corresponding to a plurality of blocks of the display panel, and a driving controller that receives an input image signal, compensates for the input image signal based on the plurality of compensation signals, and outputs an output image signal. The driving controller includes a first to a fourth memory that stores the plurality of compensation signals from the memory, a first correction value calculator that outputs a first to a fourth correction signal corresponding to the input image signal based on the first to fourth compensation signals from the first to fourth memories, a second correction value calculator that outputs a final compensation signal based on the first to fourth correction signals, and a compensator that compensates for the input image signal based on the final compensation signal and outputs the output image signal. The plurality of compensation signals stored in the memory include first row compensation signals corresponding to blocks disposed at a first row from among the plurality of blocks and second row compensation signals corresponding to blocks disposed at a second row from among the plurality of blocks. Some of the first row compensation signals are stored in the first memory, the others of the first row compensation signals are stored in the second memory, some of the second row compensation signals are stored in the third memory, and the others of the second row compensation signals are stored in the fourth memory.

In an embodiment, odd-numbered first row compensation signals among the first row compensation signals may be stored in the first memory, and even-numbered first row compensation signals among the first row compensation signals may be stored in the second memory. Odd-numbered second row compensation signals among the second row compensation signals may be stored in the third memory, and even-numbered second row compensation signals among the second row compensation signals may be stored in the fourth memory.

In an embodiment, each of the first to fourth compensation signals may include first compensation values for a first image signal, second compensation values for a second image signal, and third compensation values for a third image signal.

In an embodiment, each of the first to fourth memories may include a first and a second sub-memory storing the first compensation values, a third and a fourth sub-memory storing the second compensation values, and a fifth and a sixth sub-memory storing the third compensation values.

In an embodiment, odd-numbered first compensation values among the first compensation values may be stored in the first sub-memory, and even-numbered first compensation values among the first compensation values may be stored in the second sub-memory.

According to an embodiment, a method of operating a display device, which includes a memory storing a plurality of compensation signals respectively corresponding to a plurality of blocks of a display panel, includes storing some of first row compensation signals corresponding to blocks disposed at a first row from among the plurality of blocks in a first memory and storing the others of the first row compensation signals in a second memory, storing some of second row compensation signals corresponding to blocks disposed at a second row from among the plurality of blocks in a third memory and storing the others of the second row compensation signals in a fourth memory, receiving an input image signal, and outputting an output image signal by compensating for the input image signal based on first to fourth compensation signals respectively provided from the first to fourth memories.

In an embodiment, odd-numbered row compensation signals among the first row compensation signals may be stored in the first memory, and even-numbered row compensation signals among the first row compensation signals may be stored in the second memory. Odd-numbered row compensation signals among the second row compensation signals may be stored in the third memory, and even-numbered row compensation signals among the second row compensation signals may be stored in the fourth memory.

In an embodiment, a sum of respective sizes of the first to fourth memories may be smaller than a size of the memory.

According to an embodiment, a display device includes a display panel, a memory that stores a plurality of compensation signals respectively corresponding to a plurality of blocks of the display panel, and a driving controller that receives an input image signal, compensates for the input image signal based on the plurality of compensation signals, and outputs an output image signal. The driving controller includes a first internal memory that stores the plurality of compensation signals from the memory as an internal compensation signal, a first to a sixth memory that stores the internal compensation signal from the first internal memory, and a compensation unit that compensates for the input image signal based on a first to a fourth compensation signal provided from some of the first to sixth memories and outputs the output image signal. The plurality of compensation signals stored in the first internal memory include first row compensation signals corresponding to blocks disposed at a first row from among the plurality of blocks and second row compensation signals corresponding to blocks disposed at a second row from among the plurality of block. Some of the first row compensation signals are stored in the first, third, and fifth memories, and some of the second row compensation signals are stored in the second, fourth, and sixth memories.

In an embodiment, the compensation unit may simultaneously read the first to fourth compensation signals from some of the first to sixth memories.

In an embodiment, the compensation unit may simultaneously perform operations of reading the first to fourth compensation signals from the first to fourth memories among the first to sixth memories, storing some of the first row compensation signals in the fifth memory, and storing some of the second row compensation signals in the sixth memory.

In an embodiment, the compensation unit may include a first correction value calculator that outputs first to fourth correction signals corresponding to the input image signal based on the first to fourth compensation signals, a second correction value calculator that outputs a final compensation signal based on the first to fourth correction signals, and a compensator that compensates for the input image signal based on the final compensation signal and outputs the output image signal.

In an embodiment, the second correction value calculator may output the final compensation signal by a bilinear interpolation method, based on the first to fourth correction signals.

In an embodiment, each of the first to fourth compensation signals may include first compensation values for a first image signal, second compensation values for a second image signal, and third compensation values for a third image signal.

In an embodiment, each of the first to sixth memories may include a first and a second sub-memory storing the first compensation values, a third and a fourth sub-memory storing the second compensation values, and a fifth and a sixth sub-memory storing the third compensation values.

In an embodiment, odd-numbered first compensation values among the first compensation values may be stored in the first sub-memory, and even-numbered first compensation values among the first compensation values may be stored in the second sub-memory.

In an embodiment, the first image signal may correspond to a first color, and the first compensation values may respectively correspond to a plurality of gray levels of the first color.

In an embodiment, the first correction value calculator may output the first correction signal corresponding to the first color of the first image signal based on one of the odd-numbered first compensation values stored in the first sub-memory and one of the even-numbered first compensation values stored in the second sub-memory.

BRIEF DESCRIPTION OF THE FIGURES

The above and other objects and features of the present disclosure will become apparent by describing in detail embodiments thereof with reference to the accompanying drawings.

FIG. 5 illustrates 11-th to 67-th compensation signals stored in a second external memory.

FIG. 6 illustrates a compensation value corresponding to each of a first image signal, a second image signal, and a third image signal included in a 11-th compensation signal.

DETAILED DESCRIPTION

Figure 1:
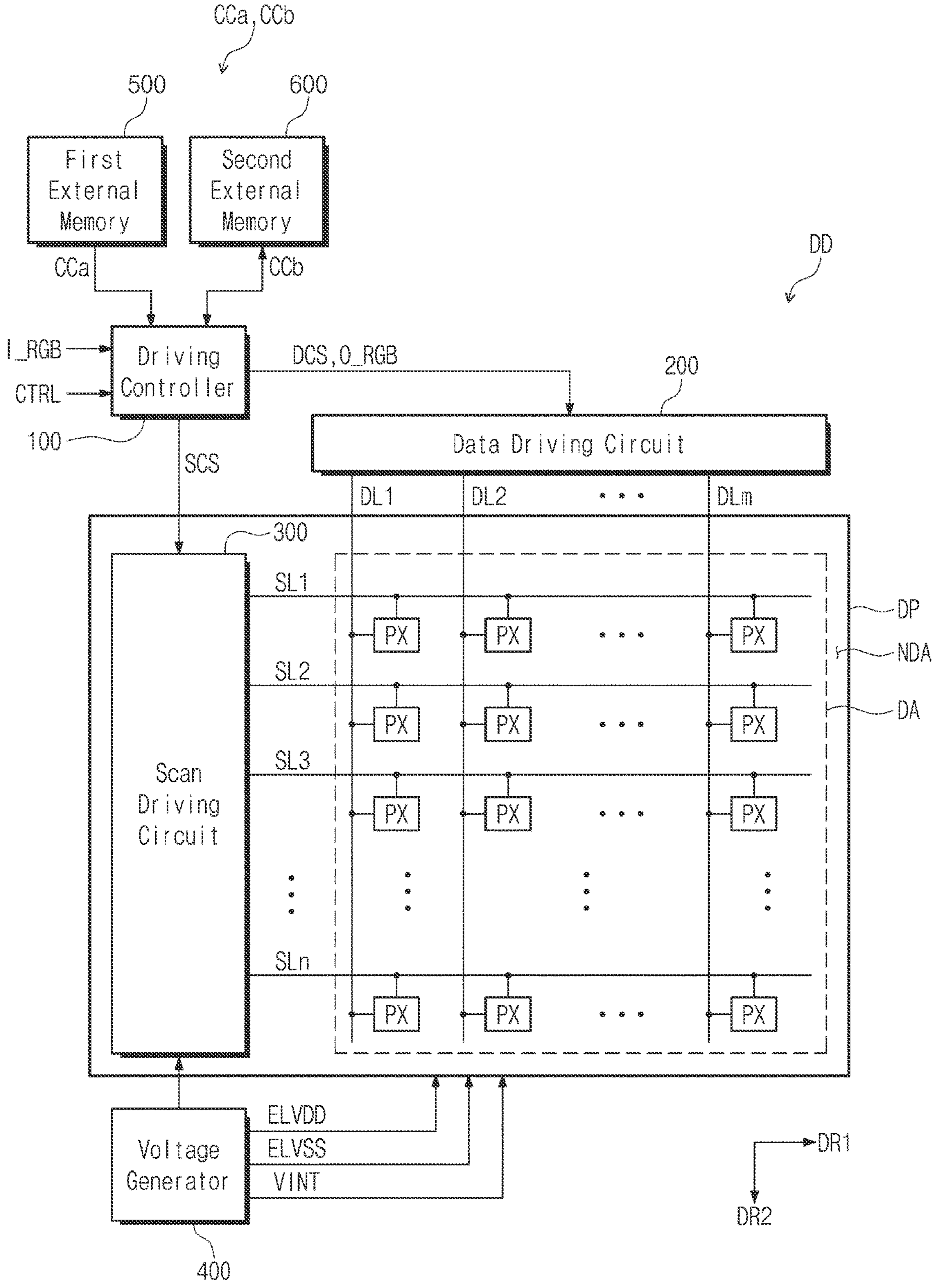
FIG. 1 is a block diagram of a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference characters refer to the same components. Also, in drawings, the thickness, ratio, and dimension of components are exaggerated for effectiveness of description of technical contents.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

FIG. 1 is a block diagram of a display device DD according to an embodiment of the present disclosure.

Referring to FIG. 1, the display device DD includes a driving controller 100, a data driving circuit 200, a scan driving circuit 300, a voltage generator 400, a first external memory 500, a second external memory 600, and a display panel DP.

The driving controller 100 receives an input image signal I_RGB and a control signal CTRL. The driving controller 100 provides a data control signal DCS and an output image signal O_RGB to the data driving circuit 200. The driving controller 100 provide a scan control signal SCS to the scan driving circuit 300.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. The data signals refer to analog voltages corresponding to the output image signal O_RGB.

The scan driving circuit 300 receives the scan control signal SCS from the driving controller 100. The scan driving circuit 300 outputs scan signals to a plurality of scan lines SL1 to SLn to be described later. In an embodiment, the scan signals that are provided to the plurality of scan lines SL1 to SLn may sequentially transitions to the active level.

The display panel DP according to an embodiment of the present disclosure may be a light emitting display panel. For example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc. In an embodiment, below, the description will be given under the condition that the display panel DP is an organic light emitting display panel.

The display panel DP may include the scan lines SL1 to SLn, the data lines DL1 to DLm, and pixels PX.

Each of the pixels PX may be connected to a corresponding scan line among the scan lines SL1 to SLn and may be connected to a corresponding data line among to the data lines DL1 to DLm. An example in which one pixel PX is connected to one scan line is illustrated in FIG. 1, but the present disclosure is not limited thereto. One pixel PX may be electrically connected to two or more scan lines.

Each of the pixels PX may include a light emitting element (not illustrated) and a pixel circuit controlling the emission of the light emitting element. In an embodiment, the light emitting element may be an organic light emitting diode. However, the present disclosure is not limited thereto.

The scan lines SL1 to SLn extend from the scan driving circuit 300 in a first direction DR1 and are arranged to be spaced from each other in a second direction DR2. The data lines DL1 to DLm extend from the data driving circuit 200 in the second direction DR2 and are arranged to be spaced from each other in the first direction DR1.

The scan driving circuit 300 may be disposed on the display panel DP. In an embodiment, the pixels PX may be disposed in a display area DA of the display panel DP, and the scan driving circuit 300 may be disposed in a non-display area NDA of the display panel DP. In an embodiment, the scan driving circuit 300 may be formed in the same process as the pixel circuit of each of the pixels PX, but the present disclosure is not limited thereto.

In an embodiment, the data driving circuit 200 may be implemented with an integrated circuit and may be mounted on the display panel DP.

The voltage generator 400 generates a first voltage ELVDD, a second voltage ELVSS, and a third voltage VINT for the operation of the display panel DP. The number of voltages generated by the voltage generator 400 may be variously changed or modified.

The first external memory 500 stores a compensation signal CCa. The second external memory 600 stores a compensation signal CCb. In an embodiment, the first external memory 500 may be a nonvolatile memory (e.g., a flash memory), and the second external memory 600 may be a random access memory (RAM) (e.g., a DDR memory).

The driving controller 100 may read the compensation signal CCa from the first external memory 500 so as to be stored in the second external memory 600. The driving controller 100 may read the compensation signal CCb from the second external memory 600. The driving controller 100 may compensate for the input image signal I_RGB based on the compensation signal CCb and may output the output image signal O_RGB.

In an embodiment, the compensation signal CCb may include a compensation value according to a characteristic of the display panel DP.

Figure 2:
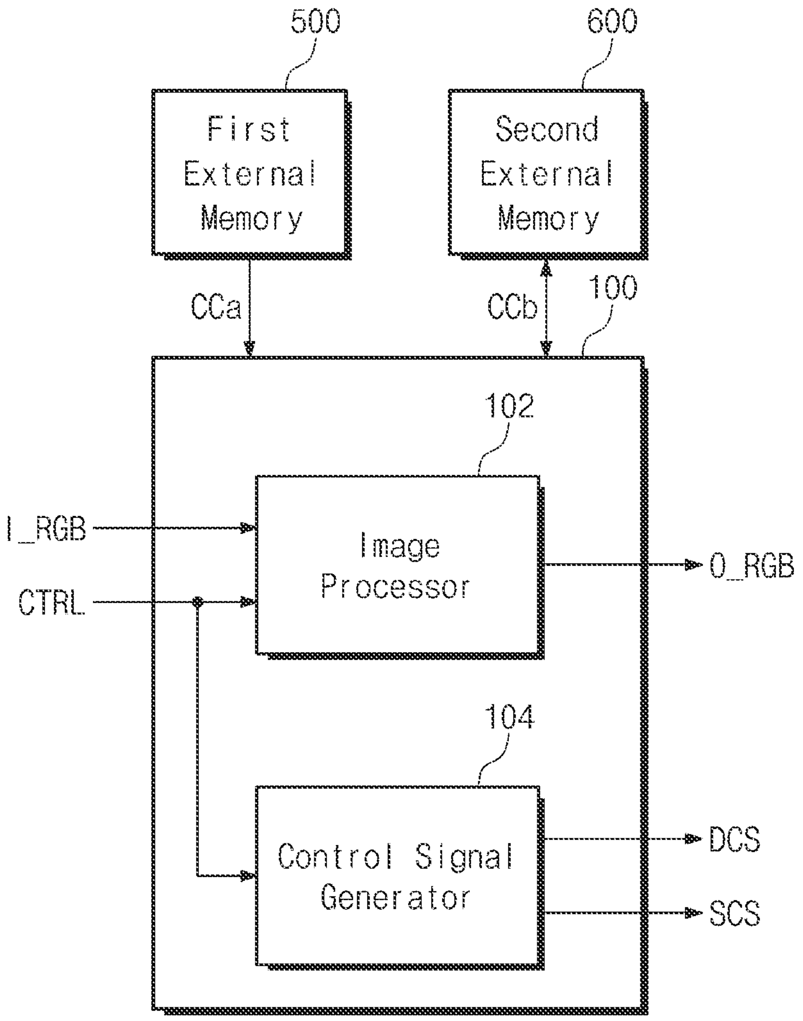
FIG. 2 is a block diagram illustrating a configuration of a driving controller according to an embodiment of the present disclosure.

FIG. 2 is a block diagram illustrating a configuration of the driving controller 100 according to an embodiment of the present disclosure.

Referring to FIGS. 1 and 2, the driving controller 100 includes an image processor 102 and a control signal generator 104.

The image processor 102 receives the input image signal I_RGB and the control signal CTRL. The image processor 102 may read the compensation signal CCa from the first external memory 500 so as to be stored in the second external memory 600. The image processor 102 compensates for the input image signal I_RGB based on the compensation signal CCb stored in the second external memory 600 and outputs the output image signal O_RGB. In an embodiment, the compensation signal CCa read from the first external memory 500 and the compensation signal CCb stored in the second external memory 600 may be identical to each other.

The control signal generator 104 receives the control signal CTRL. The control signal generator 104 outputs the data control signal DCS to be provided to the data driving circuit 200. The control signal generator 104 outputs the scan control signal SCS to be provided to the scan driving circuit 300.

Figure 3:
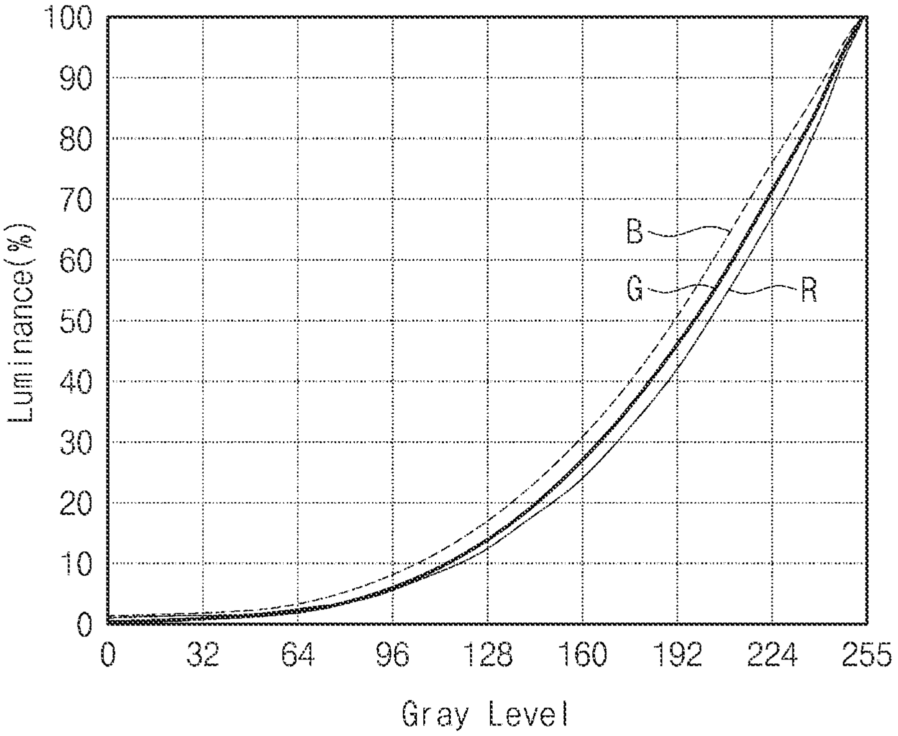
FIG. 3 is a diagram for describing a characteristic of a display panel illustrated in FIG. 1.

FIG. 3 is a diagram for describing a characteristic of the display panel DP illustrated in FIG. 1.

Referring to FIGS. 1 and 3, the input image signal I_RGB may include a first image signal "R" corresponding to a first color, a second image signal "G" corresponding to a second color, and a third image signal "B" corresponding to a third color.

In the example illustrated in FIG. 3, each of the first image signal "R", the second image signal "G", and the third image signal "B" may have gray levels from 0 to 255.

Even though the first image signal "R", the second image signal "G", and the third image signal "B" have the same gray level, the first image signal "R", the second image signal "G", and the third image signal "B" may have different luminance in an image displayed in the display panel DP. Also, due to the characteristic of the display panel DP (e.g., a characteristic of a light emitting element in the pixel PX and a process deviation of transistors in the pixel PX), the image luminance may be differently set for each of the first image signal "R", the second image signal "G", and the third image signal "B"

Figure 4A:
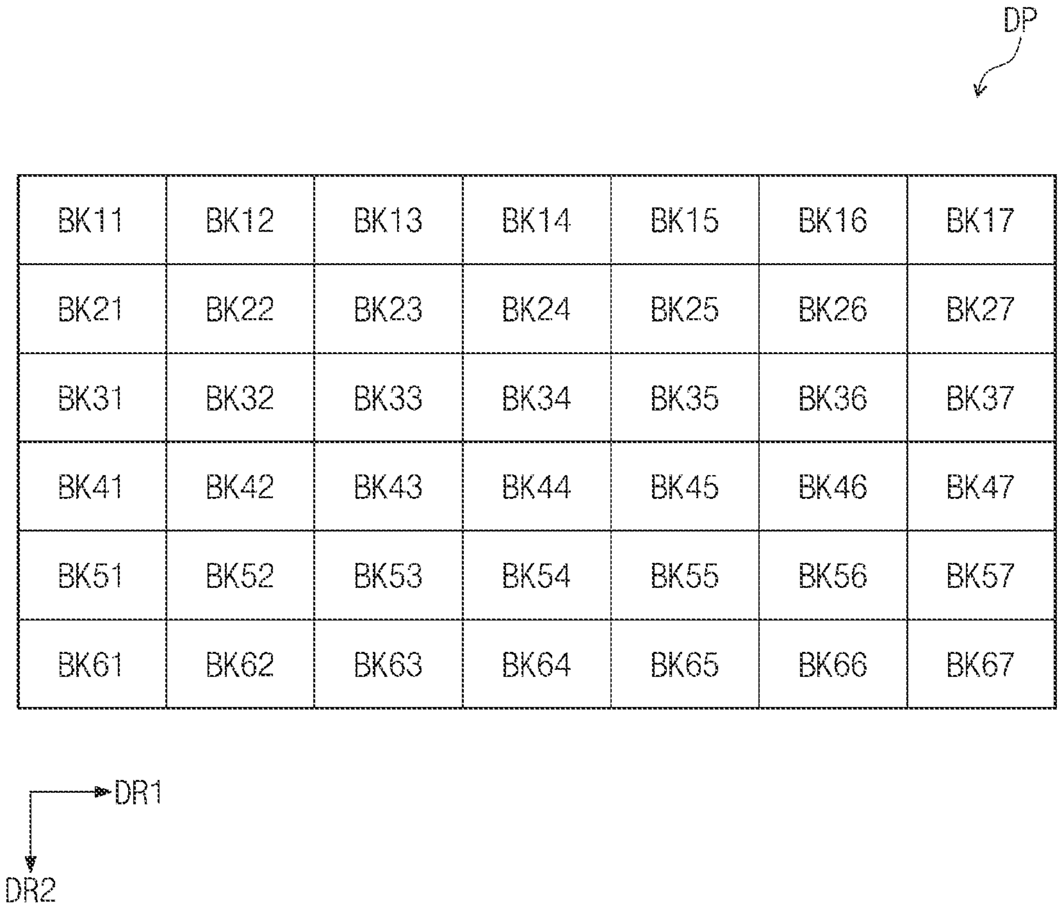
FIGS. 4A and 4B are diagrams for describing a method of obtaining a compensation signal by sensing a characteristic of a display panel.
Figure 4B:
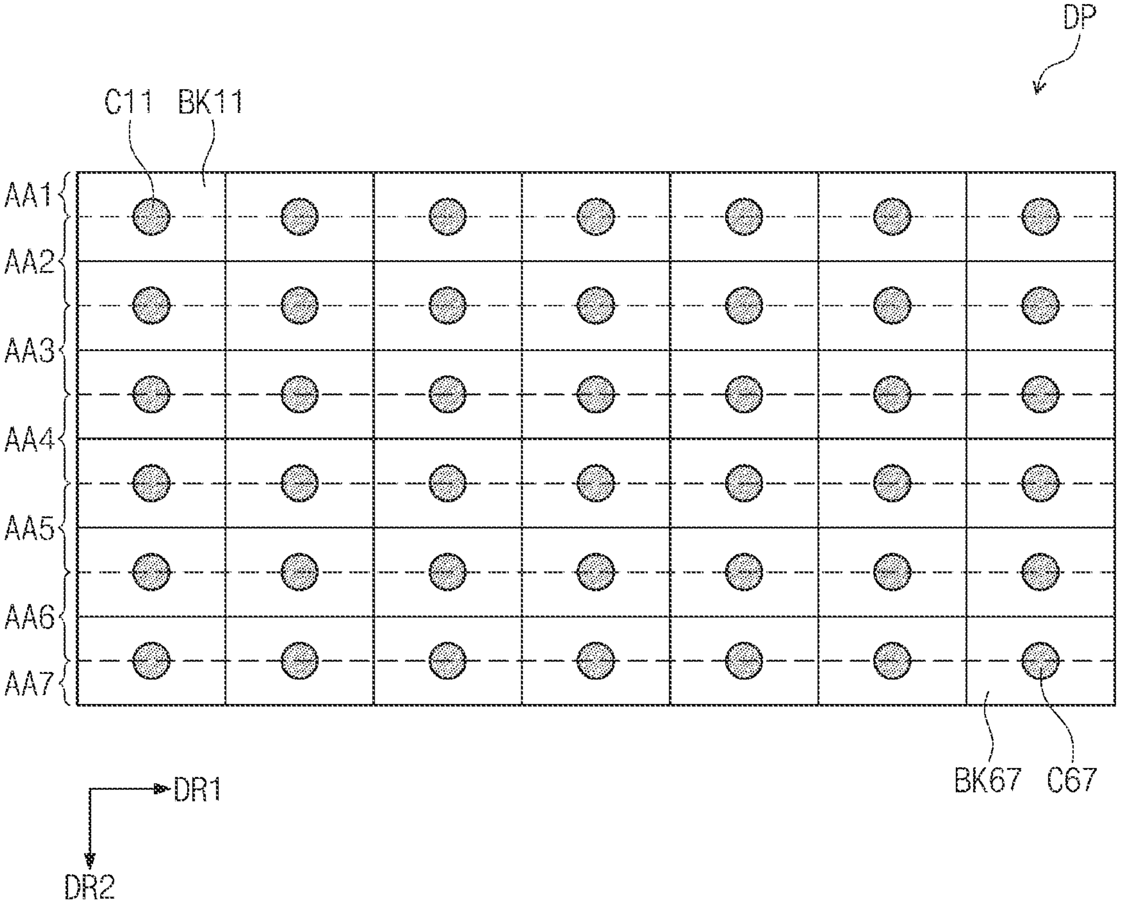

FIGS. 4A and 4B are diagrams for describing a method of obtaining a compensation signal by sensing a characteristic of the display panel DP.

Referring to FIG. 4A, the display panel DP may be divided into a plurality of blocks. The display panel DP may be divided into 42 blocks (hereinafter marked by BK11 to BK67). In detail, 7 blocks may be arranged in the first direction DR1 for each row, and 6 blocks may be arranged in the second direction DR2 for each column (i.e., the display panel DP may be divided into 42 blocks arranged in a matrix of dimensions 6×7).

An imaging device such as a camera (not illustrated) captures the display panel DP in a state where a given test image is displayed in the display panel DP. In an embodiment, 42 cameras may respectively capture the 11-th to 67-th blocks BK11 to BK67. Luminance of each of the 11-th to 67-th blocks BK11 to BK67 may be sensed based on the image obtained by each of the 42 cameras.

Referring to FIG. 4B, a test device (not illustrated) may generate 11-th to 67-th compensation signals C11 to C67 for the 11-th to 67-th blocks BK11 to BK67 based on the image displayed in the 11-th to 67-th blocks BK11 to BK67 and the luminance sensed by each of the 42 cameras. The 11-th to 67-th compensation signals C11 to C67 may respectively correspond to representative values for the 11-th to 67-th blocks BK11 to BK67. In FIG. 4B, the 11-th to 67-th compensation signals C11 to C67 are marked by a circle for easy understanding of a one-to-one correspondence between the 11-th to 67-th compensation signals C11 to C67 and the 11-th to 67-th blocks BK11 to BK67. Also, it is assumed that each of the 11-th to 67-th compensation signals C11 to C67 corresponds to a pixel (hereinafter referred to as a "center pixel") located at the center of each of the 11-th to 67-th blocks BK11 to BK67. For example, the 11-th compensation signal C11 is the representative value of the 11-th block BK11 and corresponds to the center pixel of the 11-th block BK11. The 67-th compensation signal C67 is the representative value of the 67-th block BK67 and corresponds to the center pixel of the 67-th block BK67.

In an embodiment, the test device (not illustrated) may provide the display panel DP with a data signal corresponding to each of the first image signal "R", the second image signal "G", and the third image signal "B" and may obtain the characteristic of the display panel DP as illustrated in FIG. 3.

The 11-th to 67-th compensation signals C11 to C67 are stored in the first external memory 500 (refer to FIG. 2). That is, the compensation signal CCa stored in the first external memory 500 may include the 11-th to 67-th compensation signals C11 to C67 respectively corresponding to the 11-th to 67-th blocks BK11 to BK67 of the display panel DP. The compensation signal CCa stored in the first external memory 500 may be stored in the second external memory 600 by the driving controller 100.

FIG. 5 illustrates the compensation signal CCb stored in the second external memory 600.

Referring to FIGS. 2 and 5, the compensation signal CCb stored in the second external memory 600 includes the 11-th to 67-th compensation signals C11 to C67. The 11-th to 67-th compensation signals C11 to C67 respectively correspond to the 11-th to 67-th blocks BK11 to BK67 of the display panel DP illustrated in FIG. 4B.

Each of the 11-th to 67-th compensation signals C11 to C67 may include a compensation value for each of the first image signal "R", the second image signal "G", and the third image signal "B" included in the input image signal I_RGB.

FIG. 6 illustrates a compensation value corresponding to each of the first image signal "R", the second image signal "G", and the third image signal "B" included in the 11-th compensation signal C11.

In an embodiment, when each of the first image signal "R", the second image signal "G", and the third image signal "B" is a 13-bit signal, each of the first image signal "R", the second image signal "G", and the third image signal "B" may have 0 to 8191 gray levels, that is, 8192 gray levels. In an embodiment, each of the 11-th to 67-th compensation signals C11 to C67 may only include compensation values of 96 gray levels among the 0 to 8191 gray levels, that is, 8192 gray levels.

The 11-th compensation signal C11 includes a first compensation value C11_R for the first image signal "R", a second compensation value C11_G for the second image signal "G", and a third compensation value C11_B for the third image signal "B".

The first compensation value C11_R includes compensation values a0 to a95 for 96 gray levels of the first image signal "R". The second compensation value C11_G includes compensation values b0 to b95 for 96 gray levels of the second image signal "G". The third compensation value C11_B includes compensation values c0 to c95 for 96 gray levels of the third image signal "B".

That is, the 11-th compensation signal C11 includes the compensation values a0 to a95, b0 to b95, and c0 to c95. Each of the compensation values a0 to a95, b0 to b95, and c0 to c95 may be composed of 13 bits.

Each of the 11-th to 67-th compensation signals C11 to C67 stored in the second external memory 600 illustrated in FIG. 5 may include a first compensation value, a second compensation value, and a third compensation value that are similar to the first compensation value C11_R, the second compensation value C11_G, and the third compensation value C11_B of the 11-th compensation signal C11 illustrated in FIG. 6.

A bit width of each of the 11-th to 67-th compensation signals C11 to C67 stored in the second external memory 600 illustrated in FIG. 5 may be defined by "(the number of gray levels)×(a bit width of a compensation value)×(the number of image signals)".

That is, the bit width of each of the 11-th to 67-th compensation signals C11 to C67 is 3744 (=96×13×3) bits.

When 42 compensation signals, that is, the 11-th to 67-th compensation signals C11 to C67 are stored in the second external memory 600, the size of the second external memory 600 may be a minimum of 157,248 (=3744×42) bits.

The image processor 102 loads the compensation signal CCb stored in the second external memory 600 to an internal memory for the purpose of performing a compensation process quickly. In this case, the image processor 102 may include the internal memory whose size is 157,248 bits.

Figure 7:
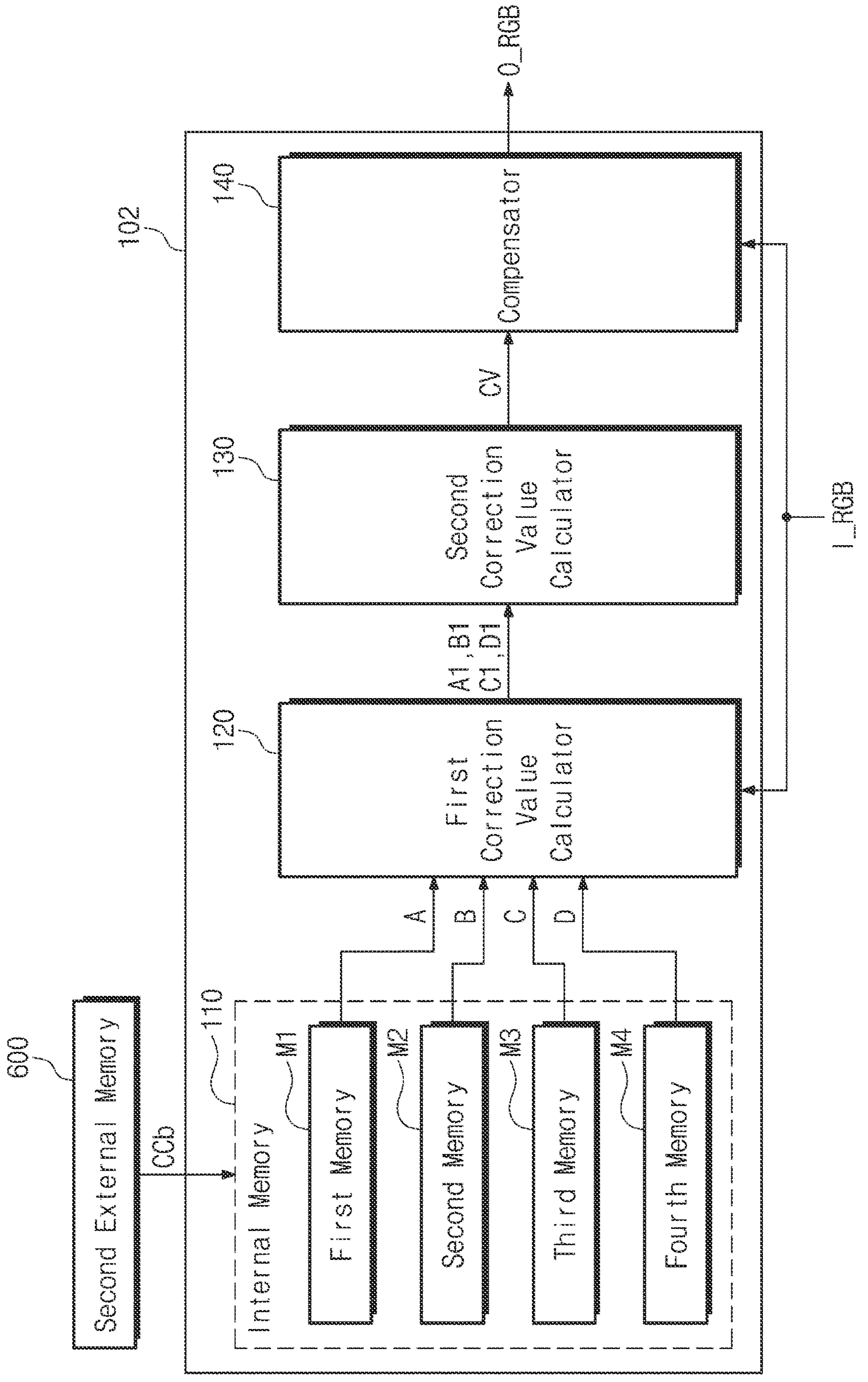
FIG. 7 is a block diagram of an image processor according to an embodiment of the present disclosure.

FIG. 7 is a block diagram of an image processor according to an embodiment of the present disclosure.

Referring to FIG. 7, the image processor 102 includes an internal memory 110 and a compensation unit.

The internal memory 110 includes first to fourth memories M1, M2, M3, and M4. The compensation signal CCb provided from the second external memory 600 may be stored in the first to fourth memories M1, M2, M3, and M4. In an embodiment, the internal memory 110 may be a volatile memory (e.g., an SRAM or a DRAM). In an embodiment, each of the first to fourth memories M1, M2, M3, and M4 of the internal memory 110 may be a register.

The first to fourth memories M1, M2, M3, and M4 is physically independent of each other. That is, the first to fourth memories M1, M2, M3, and M4 may be accessed at the same time.

The compensation unit compensates for the input image signal I_RGB based on first to fourth compensation signals A, B, C, and D read from the first to fourth memories M1, M2, M3, and M4 and outputs the output image signal O_RGB. The compensation unit includes a first correction value calculator 120, a second correction value calculator 130, and a compensator 140.

The first correction value calculator 120 reads the first to fourth compensation signals A, B, C, and D from the first to fourth memories M1, M2, M3, and M4. The first correction value calculator 120 outputs first to fourth correction signals A1, B1, C1, and D1 corresponding to the input image signal I_RGB based on the first to fourth compensation signals A, B, C, and D.

The second correction value calculator 130 outputs a final correction signal CV based on the first to fourth correction signals A1, B1, C1, and D1.

The compensator 140 compensates for the input image signal I_RGB based on the final correction signal CV and outputs the output image signal O_RGB.

Figure 8:
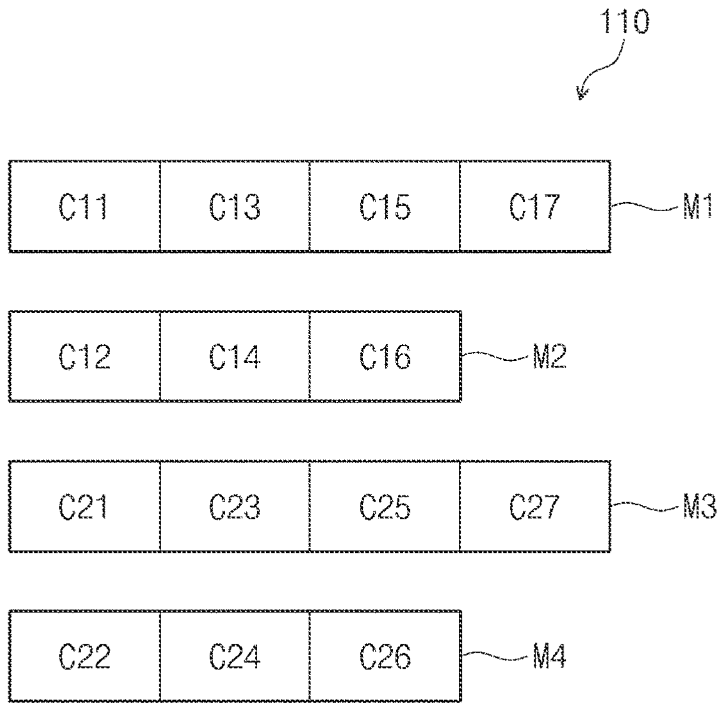
FIG. 8 is a diagram illustrating first to fourth memories.

FIG. 8 is a diagram illustrating the first to fourth memories M1, M2, M3, and M4.

Referring to FIGS. 4A, 5, 7, and 8, each of the first memory M1 and the third memory M3 has the size capable of storing 4 compensation signals among the 11-th to 67-th compensation signals C11 to C67. Each of the second memory M2 and the fourth memory M4 has the size capable of storing 3 compensation signals among the 11-th to 67-th compensation signals C11 to C67. The size of each of the first to fourth memories M1, M2, M3, and M4 illustrated in FIG. 8 is provided only as an example, and the present disclosure is not limited thereto. The size of each of the first to fourth memories M1, M2, M3, and M4 may be changed depending on the number of blocks BK11 to BK67 illustrated in FIG. 4A. For example, when the number of blocks of the display panel DP, which are arranged in the first direction DR1, is 8, each of the first to fourth memories M1, M2, M3, and M4 may have the size capable of storing 4 compensation signals.

As described above, the bit width of each of the 11-th to 67-th compensation signals C11 to C67 may be 3,744 (=96×13×3) bits. In this case, the size of each of the first memory M1 and the third memory M3 may be 14,976 (=3744×4) bits. Also, the size of each of the second memory M2 and the fourth memory M4 may be 11,232 (=3744×3) bits. That is, the total size of the internal memory 110 may be 26,208 bits. The total size of the internal memory 110, that is, a sum of the sizes of the first to fourth memories M1, M2, M3, and M4 is smaller than the size of the second external memory 600.

42 compensation signals, that is, the 11-th to 67-th compensation signals C11 to C67 are stored in the second external memory 600, but 14 compensation signals are stored in the internal memory 110. In the example illustrated in FIG. 8, the 11-th to 17-th compensation signals C11 to C17 and the 21-th to 27-th compensation signals C21 to C27 may be stored in the internal memory 110 for the purpose of calculating a compensation signal corresponding to a pixel in the 11-th to 17-th blocks BK11 to BK17 and the 21-th to 27-th blocks BK21 to BK27.

Figure 9:
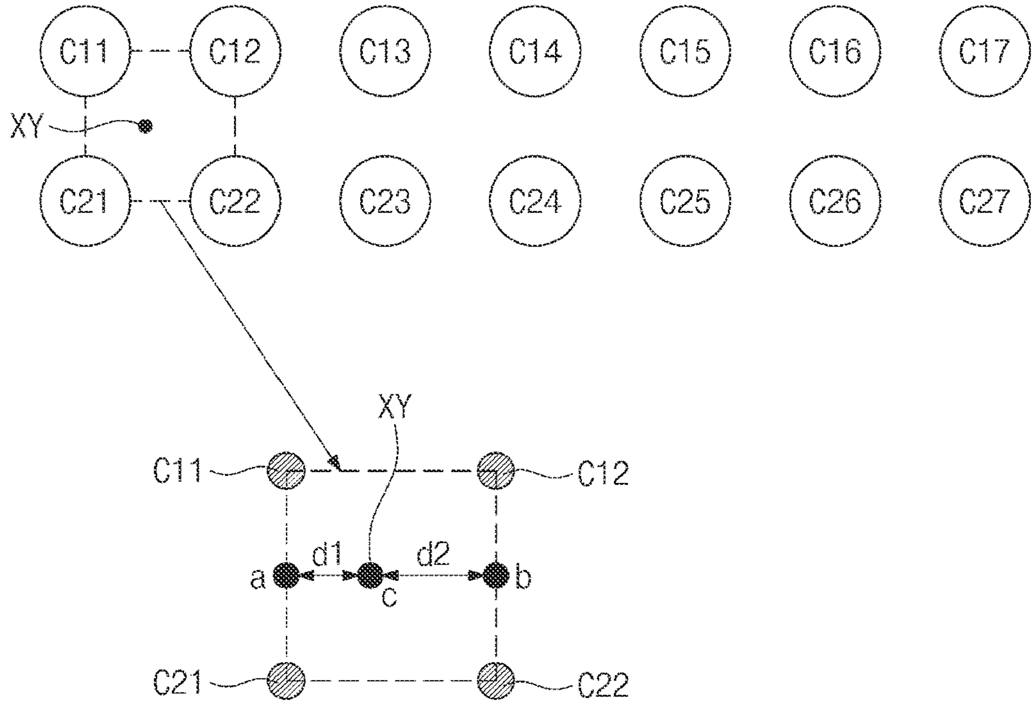
FIG. 9 is a diagram illustrating a method of calculating a compensation signal corresponding to a pixel location of a display panel based on a compensation signal stored in a second external memory.
Figure 10A:
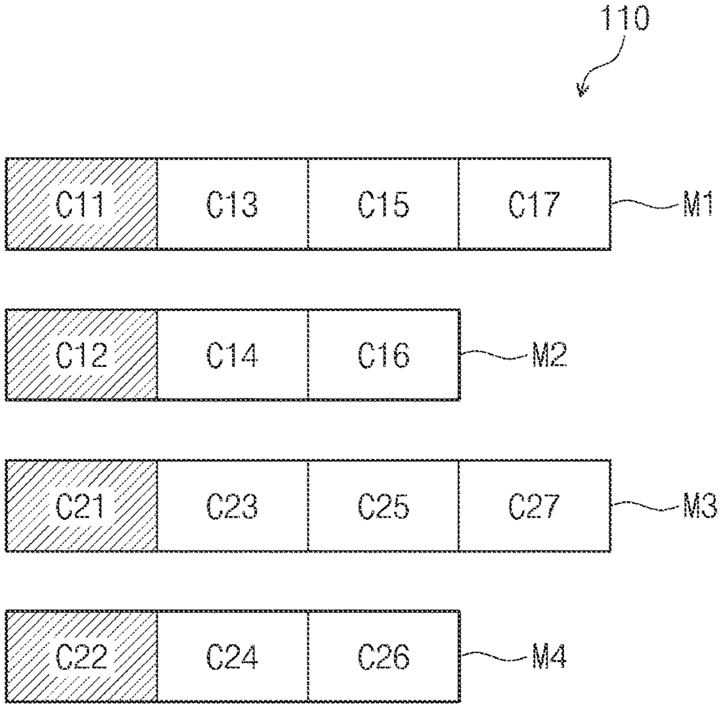
FIGS. 10A, 10B, 10C, 10D, 10E, and 10F are diagrams illustrating compensation signals stored in an internal memory to calculate a compensation signal corresponding to a pixel in the 11-th to 17-th blocks and 21-th to 27-th blocks.
Figure 10B:
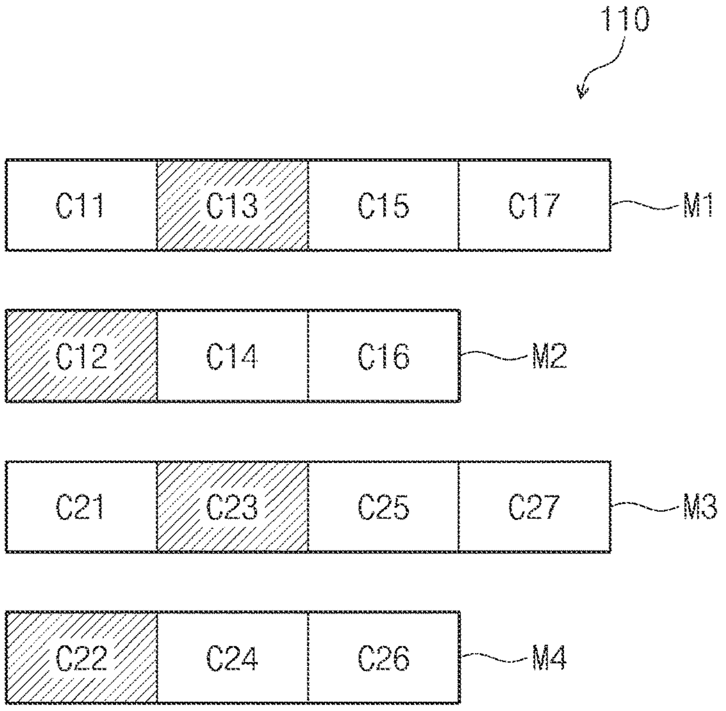
Figure 10C:
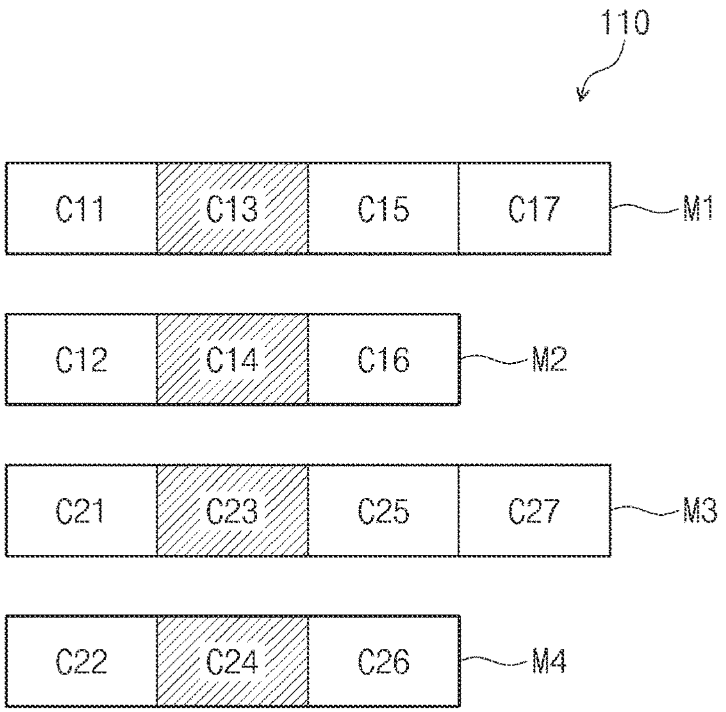
Figure 10D:
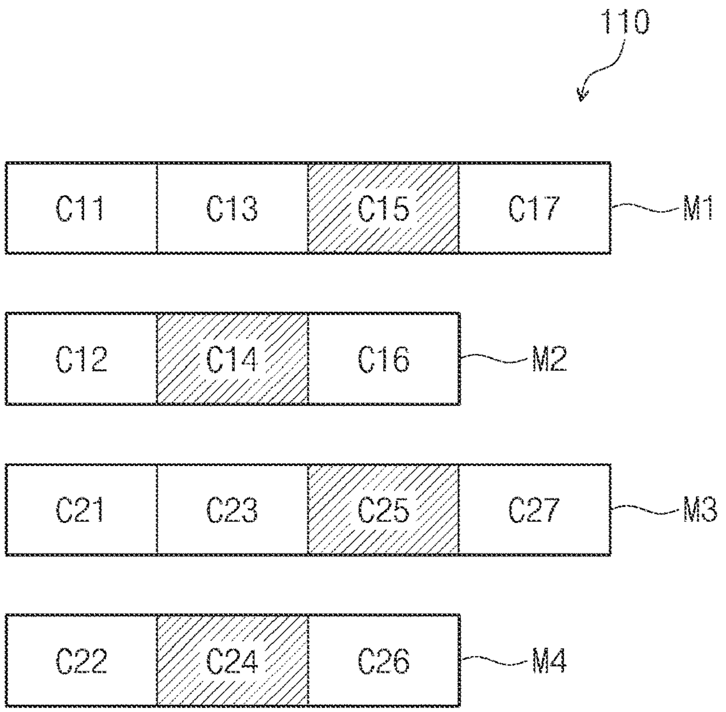
Figure 10E:
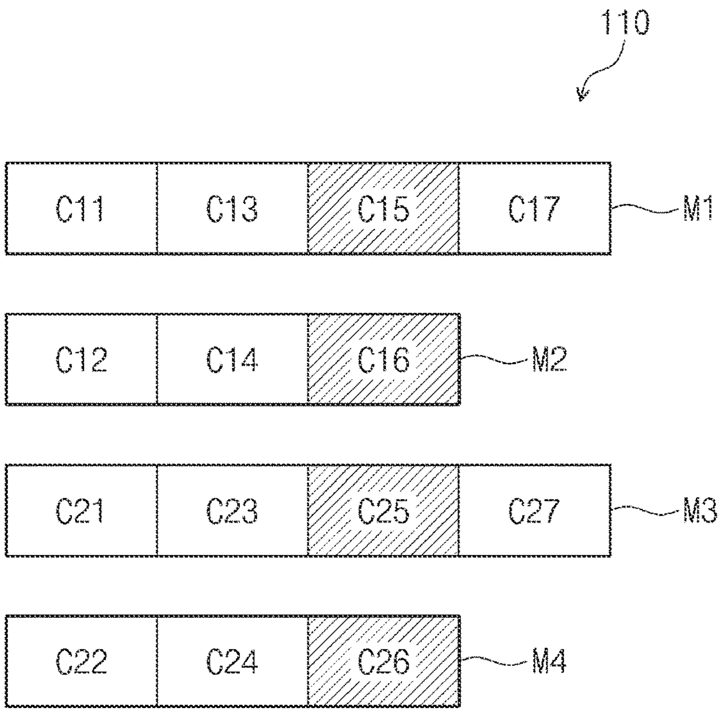
Figure 10F:
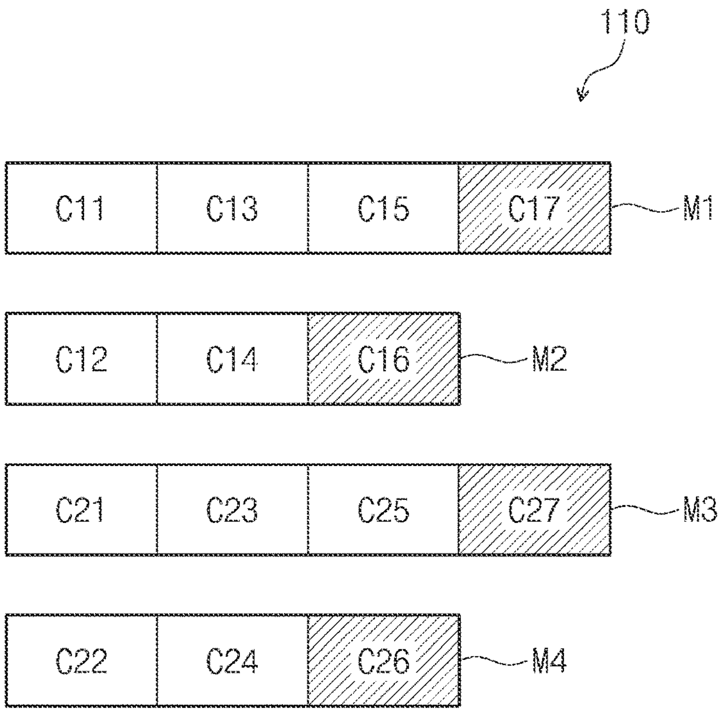

FIG. 9 is a diagram illustrating a method of calculating a compensation signal "c" corresponding to a pixel location XY of the display panel DP based on the compensation signal CCb stored in the second external memory 600.

Referring to FIGS. 4A, 5, and 9, the 11-th to 67-th compensation signals C11 to C67 respectively correspond to the 11-th to 67-th blocks BK11 to BK67 of the display panel DP. It is assumed that each of the 11-th to 67-th compensation signals C11 to C67 corresponds to a pixel (i.e., a center pixel) located at the center of the corresponding block among the 11-th to 67-th blocks BK11 to BK67.

The compensation signal "c" corresponding to a pixel located between the center pixels of the 11-th, 12-th, 21-th, and 22-th blocks BK11, BK12, BK21, and BK22 may be calculated by the interpolation method, based on the 11-th, 12-th, 21-th, and 22-th compensation signals C11, C12, C21, and C22.

A compensation signal "a" corresponding to a pixel located between the center pixels of the 11-th and 21-th blocks BK11 and BK21 may be calculated by a linear interpolation method, based on the 11-th and 21-th compensation signals C11 and C21. A compensation signal "b" corresponding to a pixel located between the center pixels of the 12-th and 22-th blocks BK12 and BK22 may be calculated based on the linear interpolation method, based on the 12-th and 22-th compensation signals C12 and C22.

The compensation signal "c" may be calculated by the linear interpolation method, based on the compensation signal "a" and the compensation signal "b".

For example, the compensation signal "c" may be calculated by Equation 1 below.

$$c = ((a \times d2) + (b \times d1))/(d1 + d2) \qquad \text{[Equation 1]}$$

4 compensation signals, that is, the 11-th, 12-th, 21-th, and 22-th compensation signals C11, C12, C21, and C22 are used to calculate the compensation signal "c" corresponding to the pixel disposed between the 11-th, 12-th, 21-th, and 22-th blocks BK11, BK12, BK21, and BK22.

That is, the compensation signal "c" may be calculated by a bilinear interpolation method, based on the 11-th, 12-th, 21-th, and 22-th compensation signals C11, C12, C21, and C22.

FIGS. 10A to 10F are diagrams illustrating compensation signals stored in the internal memory 110 to calculate a compensation signal corresponding to a pixel in the 11-th to 17-th blocks BK11 to BK17 and the 21-th to 27-th blocks BK21 to BK27.

Referring to FIGS. 4A, 4B, 7, 9, and 10A, the 11-th to 17-th compensation signals C11 to C17 (i.e., first row compensation signals) corresponding to the 11-th to 17-th blocks BK11 to BK17 (referring to FIG. 4A) disposed at the first row of the display panel DP are stored in the first memory M1 and the second memory M2. The odd-numbered compensation signals C11, C13, C15, and C17 among the 11-th to 17-th compensation signals C11 to C17 are stored in the first memory M1, and the even-numbered compensation signals C12, C14, and C16 among the 11-th to 17-th compensation signals C11 to C17 are stored in the second memory M2.

In an embodiment, the 11-th to 17-th compensation signals C11 to C17 may be stored in the first memory M1 and the second memory M2 during the vertical blank period of the control signal CTRL.

Compensation signals corresponding to pixels disposed above the center pixel of each of the 11-th to 17-th blocks BK11 to BK17, that is, pixels disposed in a first area AA1 may be calculated based on the 11-th to 17-th compensation signals C11 to C17. Therefore, it is desirable to store the 11-th to 17-th compensation signals C11 to C17 in the first memory M1 and the second memory M2 during the vertical blank period before the image processor 102 receives the valid input image signal I_RGB in one frame.

A compensation signal corresponding to a pixel located between the center pixel of the 11-th block BK11 and the center pixel of the 12-th block BK12 may be calculated based on the linear interpolation method, based on the 11-th and 12-th compensation signals C11 and C12. A compensation signal corresponding to a pixel located between the center pixel of the 12-th block BK12 and the center pixel of the 13-th block BK13 may be calculated based on the linear interpolation method, based on the 12-th and 13-th compensation signals C12 and C13. As in the above description, a compensation signal corresponding to a pixel located between the center pixel of the 13-th block BK13 and the center pixel of the 14-th block BK14, a compensation signal corresponding to a pixel located between the center pixel of the 14-th block BK14 and the center pixel of the 15-th block BK15, a compensation signal corresponding to a pixel located between the center pixel of the 15-th block BK15 and the center pixel of the 16-th block BK16, and a compensation signal corresponding to a pixel located between the center pixel of the 16-th block BK16 and the center pixel of the 17-th block BK17 may be calculated in the above method.

The 21-th to 27-th compensation signals C21 to C27 (i.e., second row compensation signals) corresponding to the 21-th to 27-th blocks BK21 to BK27 disposed at the second row of the display panel DP are stored in the third memory M3 and the fourth memory M4. The odd-numbered compensation signals C21, C23, C25, and C27 among the 21-th to 27-th compensation signals C21 to C27 are stored in the third memory M3, and the even-numbered compensation signals C22, C24, and C26 among the 21-th to 27-th compensation signals C21 to C27 are stored in the fourth memory M4.

In an embodiment, while the image processor 102 calculates the compensation signals of the first area AA1 based on the 11-th to 17-th compensation signals C11 to C17, the 21-th to 27-th compensation signals C21 to C27 should be stored in the third memory M3 and the fourth memory M4.

A second area AA2 is an area between the center pixels of the 11-th to 17-th blocks BK11 to BK17 and the center pixels of the 21-th to 27-th blocks BK21 to BK27. Compensation signals of pixels of the second area AA2 may be calculated based on the 11-th to 17-th compensation signals C11 to C17 and the 21-th to 27-th compensation signals C21 to C27.

4 compensation signals, that is, the 11-th, 12-th, 21-th, and 22-th compensation signals C11, C12, C21, and C22 are used to calculate a compensation signal corresponding to a pixel located between the center pixels of the 11-th, 12-th, 21-th, and 22-th blocks BK11, BK12, BK21, and BK22.

The first correction value calculator 120 receives the 11-th compensation signal C11 from the first memory M1, the 12-th compensation signal C12 from the second memory M2, the 21-th compensation signal C21 from the third memory M3, and the 22-th compensation signal C22 from the fourth memory M4 as the first to fourth compensation signals A, B, C, and D.

Because the first to fourth memories M1, M2, M3, and M4 are physically independent of each other, the first to fourth memories M1, M2, M3, and M4 may be accessed at the same time. The first correction value calculator 120 may simultaneously receive the first to fourth compensation signals A, B, C, and D from the first to fourth memories M1, M2, M3, and M4.

Therefore, the first correction value calculator 120 may simultaneously receive the 11-th, 12-th, 21-th, and 22-th compensation signals C11, C12, C21, and C22 for calculating the compensation signal corresponding to the pixel located between the center pixels of the 11-th, 12-th, 21-th, and 22-th blocks BK11, BK12, BK21, and BK22.

The 11-th compensation signal C11 includes the first compensation value C11_R for the first image signal "R", the second compensation value C11_G for the second image signal "G", and the third compensation value C11_B for the third image signal "B" illustrated in FIG. 6.

In the example illustrated in FIG. 6, when the gray level of the first image signal "R" included in the input image signal I_RGB is 150, the first correction value calculator 120 may calculate a compensation value corresponding to the gray level (i.e., 150) of the first image signal "R" by the interpolation method, based on a compensation value a1 corresponding to the 80 gray level and a compensation value a2 corresponding to the 162 gray level.

As in the above description, the first correction value calculator 120 outputs a first compensation signal A1 corresponding to the input image signal I_RGB, based on the first compensation value C11_R for the first image signal "R", the second compensation value C11_G for the second image signal "G", and the third compensation value C11_B of the third image signal "B" with regard to the 11-th compensation signal C11.

Also, in the same method, the first correction value calculator 120 may output second to fourth compensation signals B1, C1, and D1 corresponding to the input image signal I_RGB by calculating a first compensation value for the first image signal "R", a second compensation value for the second image signal "G", and a third compensation value for the third image signal "B" for each of the 12-th, 21-th, and 22-th compensation signals C12, C21, and C22.

The second correction value calculator 130 calculates the compensation signal "c" corresponding to the pixel location XY based on the first to fourth correction signals A1, B1, C1, and D1.

The second correction value calculator 130 calculates the compensation signal "a" based on the first and third correction signals A1 and C1. The second correction value calculator 130 calculates the compensation signal "b" based on the second and fourth correction signals B1 and D1. The second correction value calculator 130 calculates the compensation signal "c" by Equation 1 above, based on the compensation signal "a" and the compensation signal "b".

As described above, the second correction value calculator 130 calculates the compensation signal "c" corresponding to the pixel location XY by the bilinear interpolation method, based on the first to fourth correction signals A1, B1, C1, and D1.

The second correction value calculator 130 may output the compensation signal "c" as the final correction signal CV.

Referring to FIGS. 4A, 7, and 10B, 4 compensation signals, that is, the 12-th, 13-th, 22-th, and 23-th compensation signals C12, C13, C22, and C23 are required to calculate a compensation signal corresponding to a pixel located between the center pixels of the 12-th, 13-th, 22-th, and 23-th blocks BK12, BK13, BK22, and BK23.

The first correction value calculator 120 may simultaneously receive the 13-th compensation signal C13 from the first memory M1, the 12-th compensation signal C12 from the second memory M2, the 23-th compensation signal C23 from the third memory M3, and the 22-th compensation signal C22 from the fourth memory M4 as the first to fourth compensation signals A, B, C, and D.

Referring to FIGS. 4A, 7, and 10C, 4 compensation signals, that is, the 13-th, 14-th, 23-th, and 24-th compensation signals C13, C14, C23, and C24 are required to calculate a compensation signal corresponding to a pixel located between the center pixels of the 13-th, 14-th, 23-th, and 24-th blocks BK13, BK14, BK23, and BK24.

The first correction value calculator 120 may simultaneously receive the 13-th compensation signal C13 from the first memory M1, the 14-th compensation signal C14 from the second memory M2, the 23-th compensation signal C23 from the third memory M3, and the 24-th compensation signal C24 from the fourth memory M4 as the first to fourth compensation signals A, B, C, and D.

Referring to FIGS. 4A, 7, and 10D, 4 compensation signals, that is, the 14-th, 15-th, 24-th, and 25-th compensation signals C14, C15, C24, and C25 are required to calculate a compensation signal corresponding to a pixel located between the center pixels of the 14-th, 15-th, 24-th, and 25-th blocks BK14, BK15, BK24, and BK25.

The first correction value calculator 120 may simultaneously receive the 15-th compensation signal C15 from the first memory M1, the 14-th compensation signal C14 from the second memory M2, the 25-th compensation signal C25 from the third memory M3, and the 24-th compensation signal C24 from the fourth memory M4 as the first to fourth compensation signals A, B, C, and D.

Referring to FIGS. 4A, 7, and 10E, 4 compensation signals, that is, the 15-th, 16-th, 25-th, and 26-th compensation signals C15, C16, C25, and C26 are required to calculate a compensation signal corresponding to a pixel located between the center pixels of the 15-th, 16-th, 25-th, and 26-th blocks BK15, BK16, BK25, and BK26.

The first correction value calculator 120 may simultaneously receive the 15-th compensation signal C15 from the first memory M1, the 16-th compensation signal C16 from the second memory M2, the 25-th compensation signal C25 from the third memory M3, and the 26-th compensation signal C26 from the fourth memory M4 as the first to fourth compensation signals A, B, C, and D.

Referring to FIGS. 4A, 7, and 10F, 4 compensation signals, that is, the 16-th, 17-th, 26-th, and 27-th compensation signals C16, C17, C26, and C27 are required to calculate a compensation signal corresponding to a pixel located between the center pixels of the 16-th, 17-th, 26-th, and 27-th blocks BK16, BK17, BK26, and BK27.

The first correction value calculator 120 may simultaneously receive the 17-th compensation signal C17 from the first memory M1, the 16-th compensation signal C16 from the second memory M2, the 27-th compensation signal C27 from the third memory M3, and the 26-th compensation signal C26 from the fourth memory M4 as the first to fourth compensation signals A, B, C, and D.

As described with reference to FIGS. 10A to 10F, the final correction signal CV corresponding to a pixel in the 11-th to 17-th blocks BK11 to BK17 and the 21-th to 27-th blocks BK21 to BK27 may be calculated based on the 11-th to 17-th compensation signals C11 to C17 and the 21-th to 27-th compensation signals C21 to C27.

Even though the internal memory 110 stores only some of the compensation signals C11 to C67 stored in the second external memory 600, the image processor 102 may sufficiently calculate the final correction signal CV. In addition, the first correction value calculator 120 is capable of simultaneously reading 4 compensation signals, which are necessary to calculate a compensation signal corresponding to one pixel, from the internal memory 110, the operating speed of the first correction value calculator 120 may be prevented from be reduced.

Compensation signals of pixels in a third area AA3, a fourth area AA4, a fifth area AA5, a sixth area AA6, and a seventh area AA7 illustrated in FIG. 4B may be calculated in the same method as described with reference to FIGS. 10A to 10F.

Figure 11:
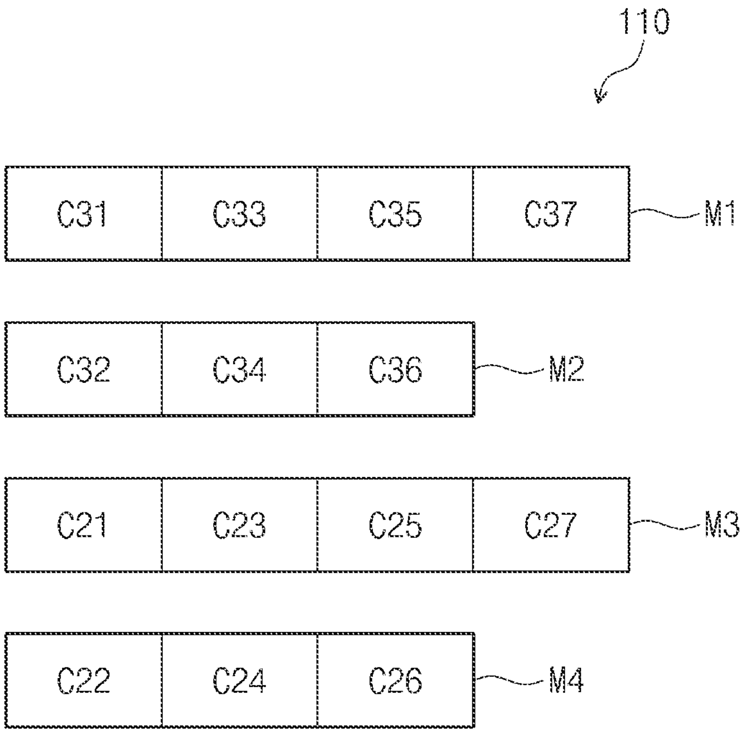
FIG. 11 is a diagram illustrating compensation signals stored in an internal memory to calculate a compensation signal corresponding to a pixel in 21-th to 27-th blocks and 31-th to 37-th blocks.

FIG. 11 is a diagram illustrating compensation signals stored in the internal memory 110 to calculate a compensation signal corresponding to a pixel in the 21-th to 27-th blocks BK21 to BK27 and the 31-th to 37-th blocks BK31 to BK37.

As described with reference to FIG. 8, the compensation signals C11 to C17 and C21 to C27 are stored in the internal memory 110 to calculate a compensation signal corresponding to a pixel in the 11-th to 17-th blocks BK11 to BK17 and the 21-th to 27-th blocks BK21 to BK27.

Referring to FIGS. 4A, 7, and 11, the 21-th to 27-th compensation signals C21 to C27 corresponding to the 21-th to 27-th blocks BK21 to BK21 disposed at the second row of the display panel DP are already present in the third memory M3 and the fourth memory M4. Therefore, the 31-th to 37-th compensation signals C31 to C37 corresponding to the 31-th to 37-th blocks BK31 to BK37 disposed at the third row of the display panel DP are stored in the first memory M1 and the second memory M2. The odd-numbered compensation signals C31, C33, C35, and C37 among the 31-th to 37-th compensation signals C31 to C37 are stored in the first memory M1, and the even-numbered compensation signals C32, C34, and C36 among the 31-th to 37-th compensation signals C31 to C37 are stored in the second memory M2.

Figure 12A:
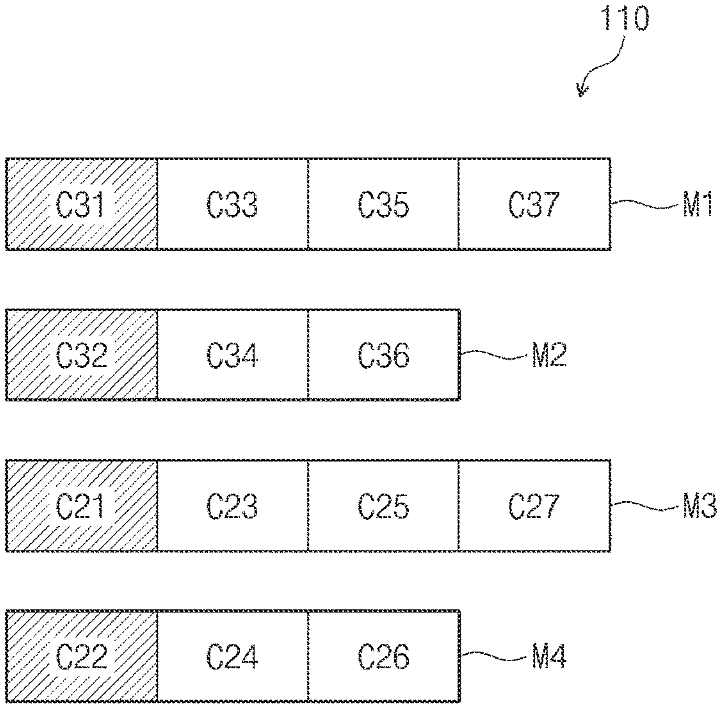
FIGS. 12A and 12B are diagrams illustrating compensation signals stored in an internal memory to calculate a compensation signal corresponding to a pixel in the 21-th to 27-th blocks and 31-th to 37-th blocks.
Figure 12B:
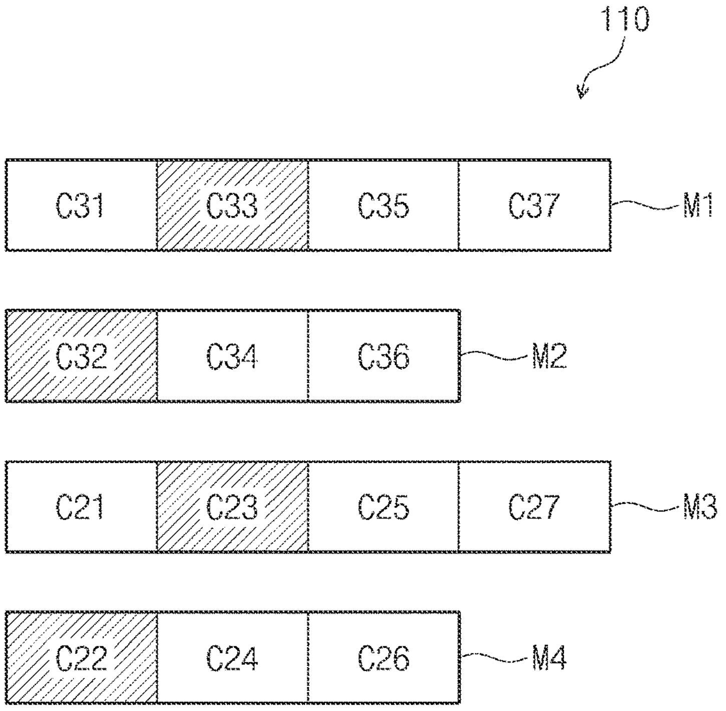

FIGS. 12A and 12B are diagrams illustrating compensation signals stored in the internal memory 110 to calculate a compensation signal corresponding to a pixel in the 21-th to 27-th blocks BK21 to BK27 and the 31-th to 37-th blocks BK31 to BK37.

Referring to FIGS. 4A, 7, and 12A, 4 compensation signals, that is, the 21-th, 22-th, 31-th, and 32-th compensation signals C21, C22, C31, and C32 are required to calculate a compensation signal corresponding to a pixel located between the center pixels of the 21-th, 22-th, 31-th, and 32-th blocks BK21, BK22, BK31, and BK32.

The first correction value calculator 120 may simultaneously receive the 31-th compensation signal C31 from the first memory M1, the 32-th compensation signal C32 from the second memory M2, the 21-th compensation signal C21 from the third memory M3, and the 22-th compensation signal C22 from the fourth memory M4 as the first to fourth compensation signals A, B, C, and D.

Referring to FIGS. 4A, 7, and 12B, 4 compensation signals, that is, the 22-th, 23-th, 32-th, and 33-th compensation signals C22, C23, C32, and C33 are required to calculate a compensation signal corresponding to a pixel located between the center pixels of the 22-th, 23-th, 32-th, and 33-th blocks BK22, BK23, BK32, and BK33.

The first correction value calculator 120 may simultaneously receive the 33-th compensation signal C33 from the first memory M1, the 32-th compensation signal C32 from the second memory M2, the 23-th compensation signal C23 from the third memory M3, and the 22-th compensation signal C22 from the fourth memory M4 as the first to fourth compensation signals A, B, C, and D.

As in the above description, the first correction value calculator 120 may calculate a compensation signal corresponding to a pixel in the 21-th to 27-th blocks BK21 to BK27 and the 31-th to 37-th blocks BK31 to BK37.

Figure 13:
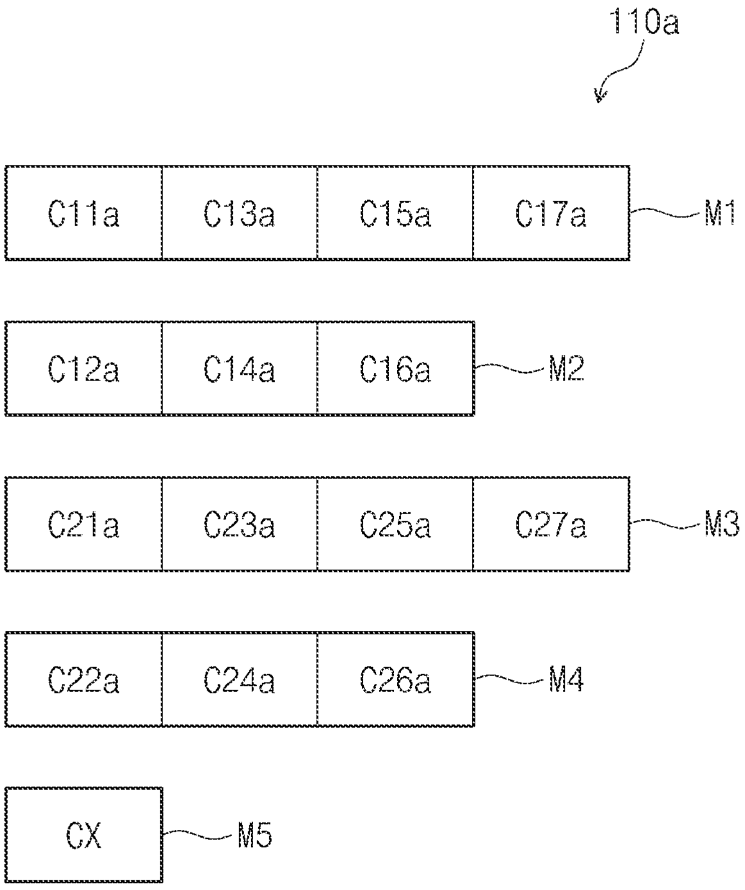
FIG. 13 is a diagram illustrating compensation signals stored in an internal memory to calculate a compensation signal corresponding to a pixel in 11-th to 17-th blocks and 21-th to 27-th blocks.

FIG. 13 is a diagram illustrating compensation signals stored in an internal memory 110*a* to calculate a compensation signal corresponding to a pixel in the 11-th to 17-th blocks BK11 to BK17 and the 21-th to 27-th blocks BK21 to BK27.

The internal memory 110*a* illustrated in FIG. 13 includes first to fifth memories M1 to M5.

Referring to FIGS. 5 and 13, each of the first memory M1 and the third memory M3 has the size capable of storing the compensation signals C11*a*/C21*a*, C13*a*/C23*a*, C15*a*/C25*a*, and C17*a*/C27*a* corresponding to 4 compensation signals among the 11-th to 67-th compensation signals C11 to C67 from the second external memory 600. Each of the second memory M2 and the fourth memory M4 has the size capable of storing the compensation signals C12*a*/C22*a*, C14*a*/C24*a*, and C16*a*/C26*a* corresponding to 3 compensation signals among the 11-th to 67-th compensation signals C11 to C67 from the second external memory 600.

The fifth memory M5 has the size capable of storing one compensation signal among the 11-th to 67-th compensation signals C11 to C67. The fifth memory M5 stores one compensation signal targeted for a reference from among the 11-th to 67-th compensation signals C11 to C67. The fifth memory M5 may store a compensation signal (e.g., C44), which corresponds to one block among the blocks BK11 to BK67 illustrated in FIG. 4A (e.g., the block BK44 located at the center of the display panel DP), from among the 11-th to 67-th compensation signals C11 to C67 as a reference compensation signal CX.

Each of the compensation signals C11*a* to C17*a* stored in the first to fourth memories M1 and M2 may be a difference value of the reference compensation signal CX stored in the fifth memory M5 and each of the 11-th to 17-th compensation signals C11 to C17. Each of the compensation signals C21*a* to C27*a* stored in the first to fourth memories M3 and M4 may be a difference value of the reference compensation signal CX stored in the fifth memory M5 and each of the 21-th to 27-th compensation signals C21 to C27.

For example, the compensation signal C11*a* is the difference value of the reference compensation signal CX and the compensation signal C11, and the compensation signal C21*a* is the difference value of the reference compensation signal CX and the compensation signal C21.

As described above as an example, the bit width of each of the 11-th to 67-th compensation signals C11 to C67 may be "96 (indicating to the number of gray level)×13 (indicating a bit width of each of the first to third compensation values C11_R, C11_G, and C11_B (refer to FIG. 6))×3 (indicating the number of image signals R, G, and B)" bits, that is, 3,744 bits.

When the bit width of each of the compensation signals C11*a* to C17*a* and C21*a* to C27*a* stored in the first to fourth memories M1 to M4, that is, the bit width of each of the first to third compensation values C11_R, C11_G, and C11_B is set to be smaller than 13, the size of the first to fourth memories M1 to M4 may decrease.

For example, when the bit width of each of the first to third compensation values C11_R, C11_G, and C11_B is changed to 7, the size of each of the first memory M1 and the third memory M3 is 8064 (=96×7×3×4) bits. Also, the size of each of the second memory M2 and the fourth memory M4 may be 6,048 (=96×7×3×3) bits.

The bit width of each of the first to third compensation values C11_R, C11_G, and C11_B of the compensation signals C11*a* to C17*a* and C21*a* to C27*a* stored in the first to fourth memories M1 to M4 may be variously changed or modified.

Figure 14:
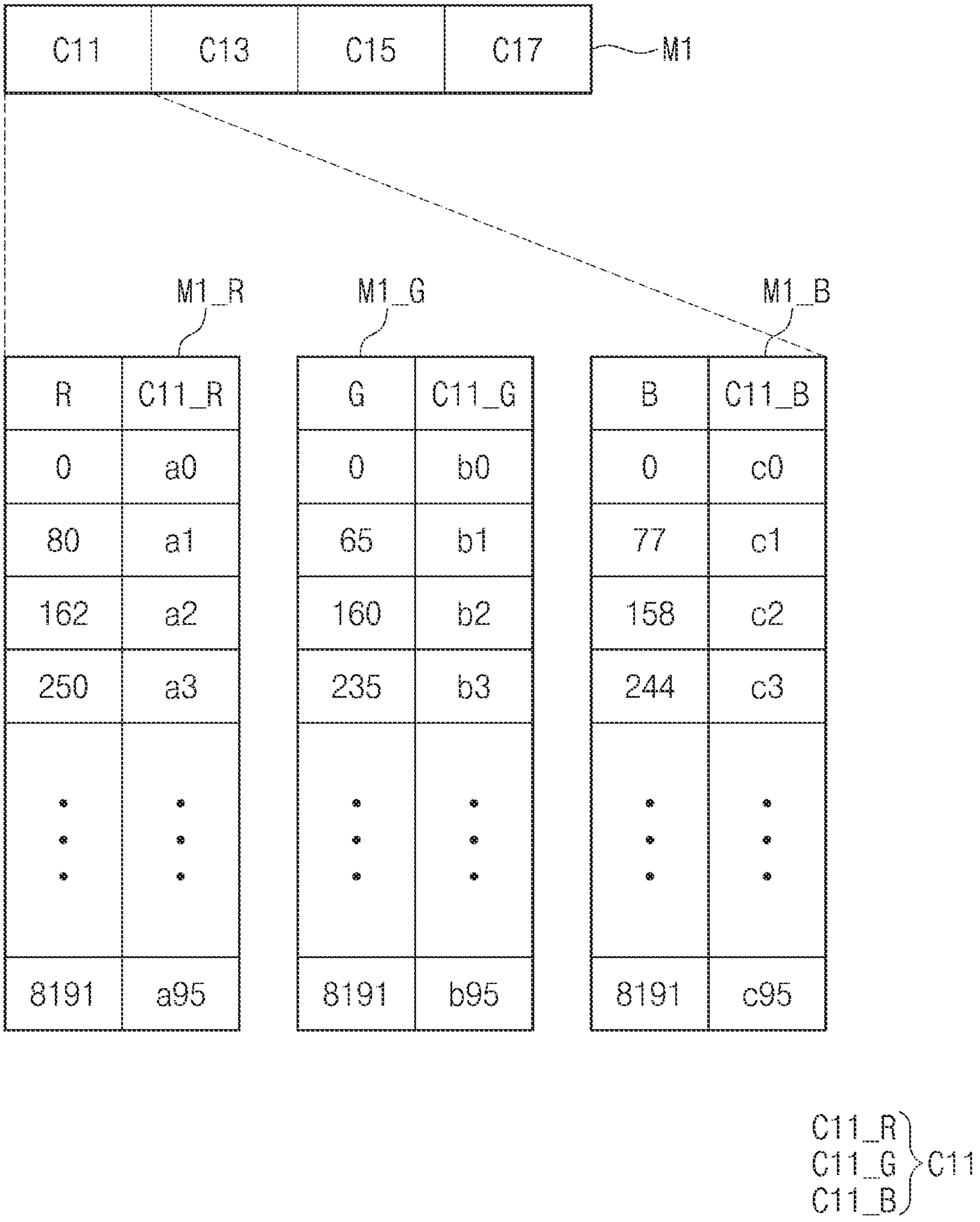
FIG. 14 is a diagram illustrating a structure of a first memory according to an embodiment of the present disclosure.

FIG. 14 is a diagram illustrating a structure of the first memory M1 according to an embodiment of the present disclosure.

Referring to FIG. 14, the first memory M1 includes a first sub-memory M1_R, a second sub-memory M1_G, and a third sub-memory M1_B.

The 11-th compensation signal C11 stored in the first memory M1 includes the first compensation value C11_R for the first image signal "R", the second compensation value C11_G for the second image signal "G", and the third compensation value C11_B for the third image signal "B".

The first sub-memory M1_R stores the first compensation value C11_R for the first image signal "R". The second sub-memory M1_G stores the second compensation value C11_G for the second image signal "G". The third sub-memory M1_B stores the third compensation value C11_B for the third image signal "B".

In an embodiment, the first compensation value C11_R, the second compensation value C11_G, and the third compensation value C11_B may be the same as those illustrated in FIG. 6 as an example.

Each of the 13-th, 15-th, and 17-th compensation signals C13, C15, and C17 stored in the first memory M1 may include first to third compensation signals that are similar to those of the 11-th compensation signal C11.

The first memory M1 may further include sub-memories for storing the 13-th, 15-th, and 17-th compensation signals C13, C15, and C17, as well as the first sub-memory M1_R, the second sub-memory M1_G, and the third sub-memory M1_B for storing the 11-th compensation signal C11. The sub-memories for storing the 13-th, 15-th, and 17-th compensation signals C13, C15, and C17 may be similar in structure to the first sub-memory M1_R, the second sub-memory M1_G, and the third sub-memory M1_B.

Figure 15:
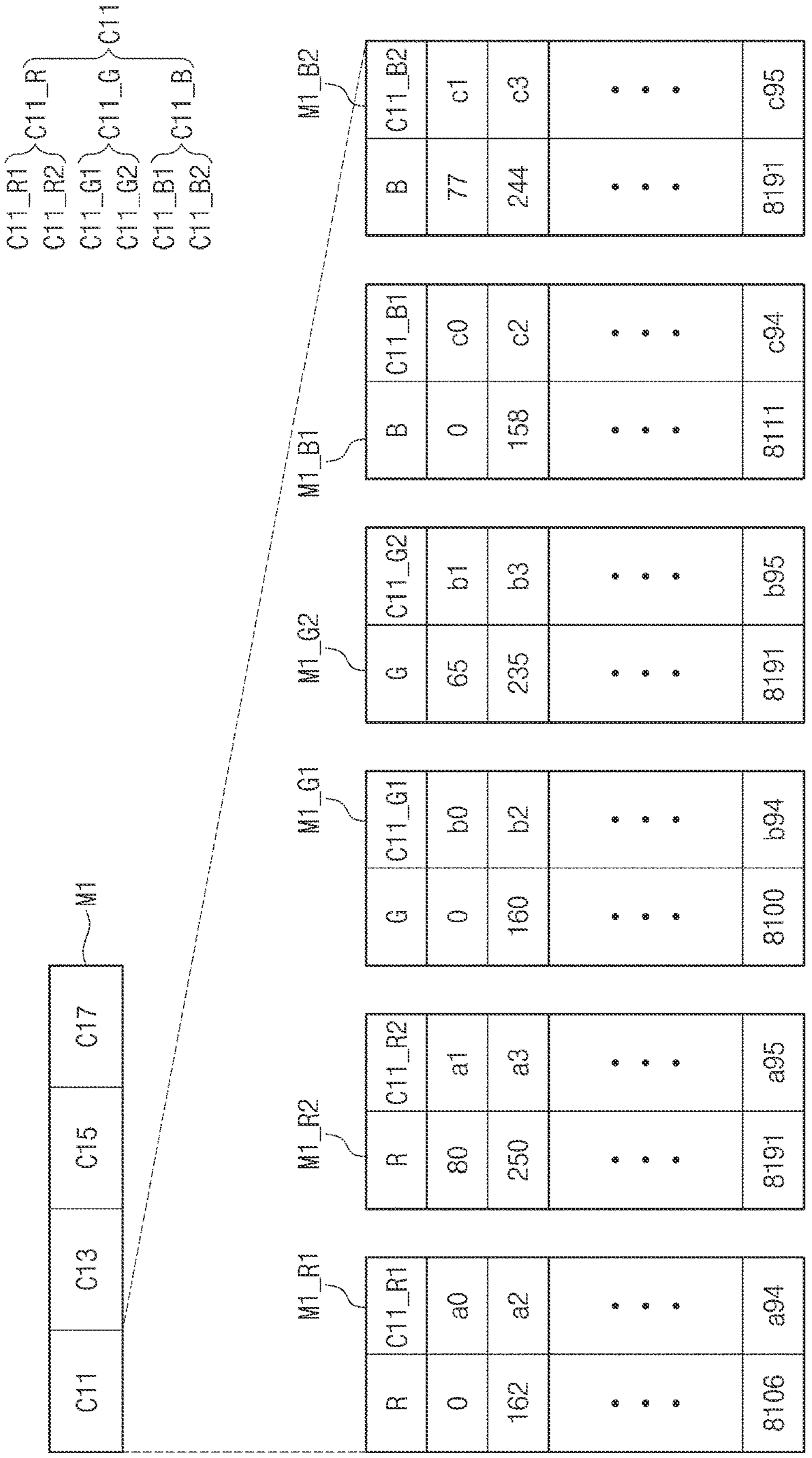
FIG. 15 is a diagram illustrating a structure of a first memory according to an embodiment of the present disclosure.

FIG. 15 is a diagram illustrating a structure of the first memory M1 according to an embodiment of the present disclosure.

Referring to FIG. 15, the first memory M1 includes first to sixth sub-memories M1_R1, M1_R2, M1_G1, M1_G2, M1_B1, and M1_B2.

The 11-th compensation signal C11 stored in the first memory M1 includes the first compensation value C11_R for the first image signal "R", the second compensation value C11_G for the second image signal "G", and the third compensation value C11_B for the third image signal "B".

The first compensation value C11_R may include a first sub-compensation value C11_R1 and a second sub-compensation value C11_R2. The first sub-memory M1_R1 stores the first sub-compensation value C11_R1. The second sub-memory M1_R2 stores the second sub-compensation value C11_R2.

The first sub-compensation value C11_R1 includes the odd-numbered compensation values a0, a2, . . . , a94 of the first compensation value C11_R. The second sub-compensation value C11_R2 includes the even-numbered compensation values a1, a3, . . . , a95 of the first compensation value C11_R.

The second compensation value C11_G may include a third sub-compensation value C11_G1 and a fourth sub-compensation value C11_G2. The third sub-memory M1_G1 stores the third sub-compensation value C11_G1. The fourth sub-memory M1_G2 stores the fourth sub-compensation value C11_G2.

The third sub-compensation value C11_G1 includes the odd-numbered compensation values b0, b2, . . . , b94 of the second compensation value C11_G. The fourth sub-compensation value C11_G2 includes the even-numbered compensation values b1, b3, . . . , b95 of the second compensation value C11_G.

The third compensation value C11_B may include a fifth sub-compensation value C11_B1 and a sixth sub-compensation value C11_B2. The fifth sub-memory M1_B1 stores the fifth sub-compensation value C11_B1. The sixth sub-memory M1_B2 stores the sixth sub-compensation value C11_B2.

The fifth sub-compensation value C11_B1 may include the odd-numbered compensation values c0, c2, . . . , c94 of the third compensation value C11_B. The sixth sub-compensation value C11_B2 may include the even-numbered compensation values c1, c3, . . . , c95 of the third compensation value C11_B.

The first memory M1 may further include sub-memories for storing the 13-th, 15-th, and 17-th compensation signals C13, C15, and C17, as well as the first to sixth sub-memories M1_R1, M1_R2, M1_G1, M1_G2, M1_B1, and M1_B2 for storing the 11-th compensation signal C11. The sub-memories for storing the 13-th, 15-th, and 17-th compensation signals C13, C15, and C17 may be similar in structure to the first to sixth sub-memories M1_R1, M1_R2, M1_G1, M1_G2, M1_B1, and M1_B2.

When the gray level of the first image signal "R" included in the input image signal I_RGB is 150, the first correction value calculator 120 illustrated in FIG. 7 may calculate a compensation value corresponding to the gray level (i.e., 150) of the first image signal "R", based on the compensation value a1 corresponding to the 80 gray level and the compensation value a2 corresponding to the 162 gray level.

The compensation value a1 corresponding to the 80 gray level is stored in the second sub-memory M1_R2, and the compensation value a2 corresponding to the 162 gray level is stored in the first sub-memory M1_R1. Therefore, the first correction value calculator 120 may simultaneously read the compensation values a1 and a2 from the first sub-memory M1_R1 and the second sub-memory M1_R2. This may mean that the operating speed of the first correction value calculator 120 is prevented from being reduced.

Figure 16:
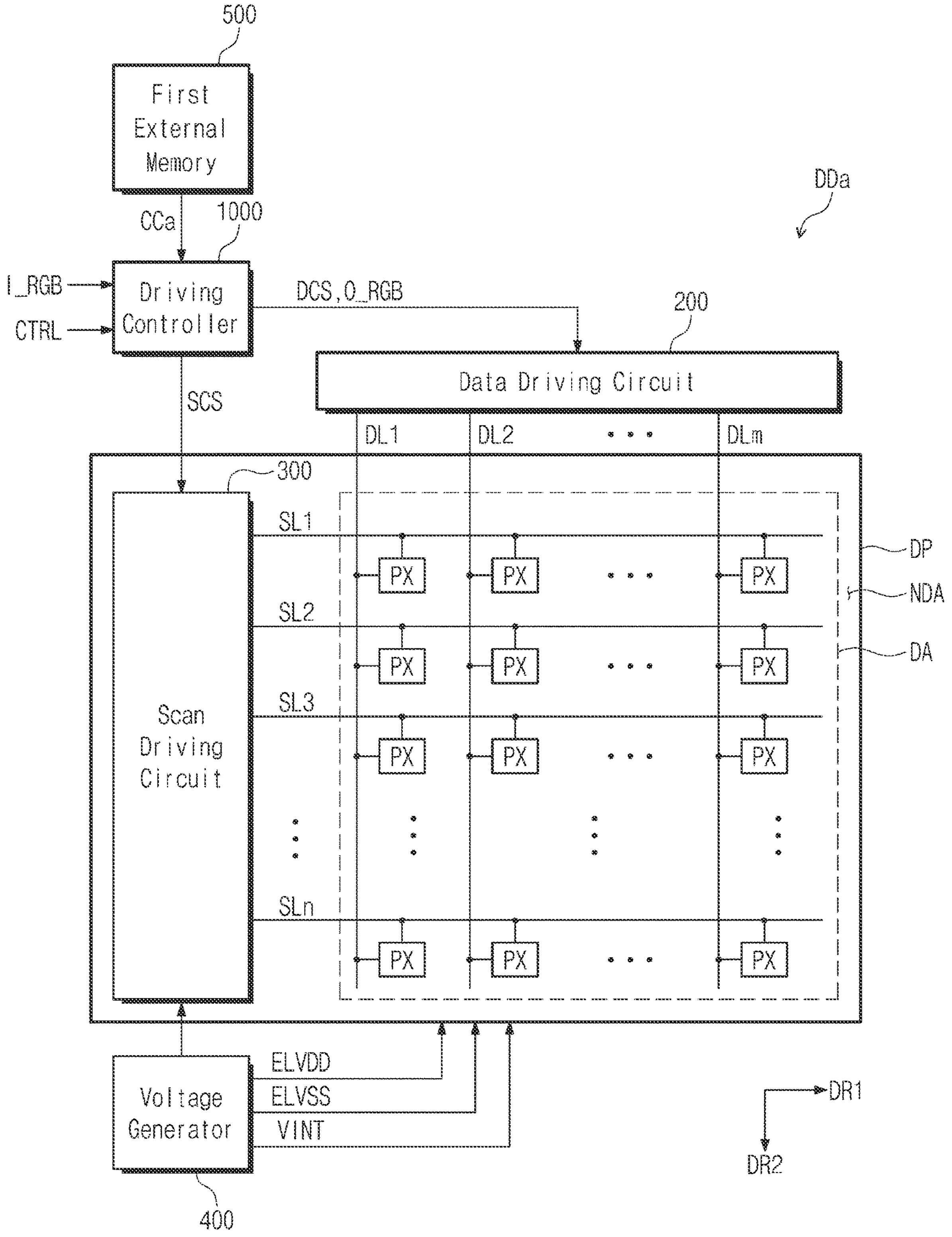
FIG. 16 is a block diagram illustrating a display device according to an embodiment of the present disclosure.

FIG. 16 is a block diagram of a display device DDa according to an embodiment of the present disclosure.

Referring to FIG. 16, the display device DDa includes a driving controller 1000, the data driving circuit 200, the scan driving circuit 300, the voltage generator 400, the first external memory 500, and the display panel DP. The data driving circuit 200, the scan driving circuit 300, the voltage generator 400, the first external memory 500, and the display panel DP are the same as the data driving circuit 200, the scan driving circuit 300, the voltage generator 400, the first external memory 500, and the display panel DP of the display device DD illustrated in FIG. 1 and are marked by the same reference characters, and thus, additional description will be omitted to avoid redundancy.

The first external memory 500 stores the compensation signal CCa. The driving controller 1000 may compensate for the input image signal I_RGB based on the compensation signal CCa read from the first external memory 500 and may output the output image signal O_RGB. In an embodiment, the compensation signal CCa may include a compensation value according to a characteristic of the display panel DP.

Figure 17:
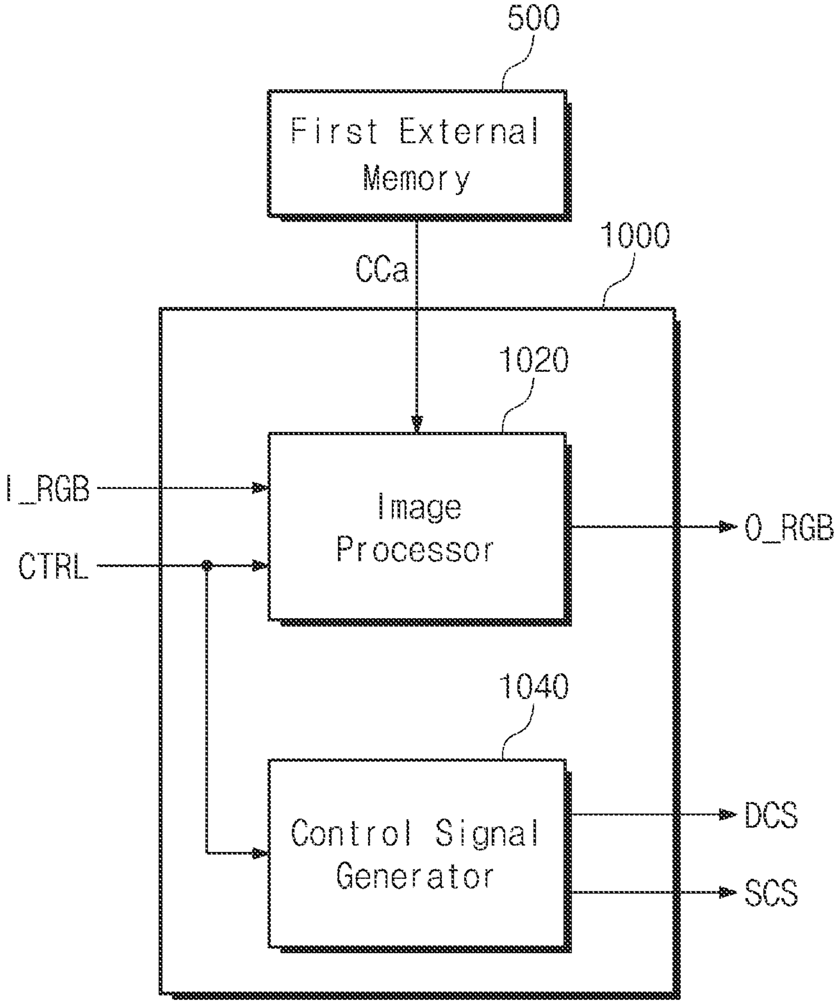
FIG. 17 is a block diagram illustrating a configuration of a driving controller according to an embodiment of the present disclosure.

FIG. 17 is a block diagram illustrating a configuration of the driving controller 1000 according to an embodiment of the present disclosure.

Referring to FIGS. 16 and 17, the driving controller 1000 includes an image processor 1020 and a control signal generator 1040.

The image processor 1020 receives the input image signal I_RGB and the control signal CTRL. The image processor 1020 compensates for the input image signal I_RGB based on the compensation signal CCa stored in the first external memory 500 and outputs the output image signal O_RGB.

The control signal generator 1040 receives the control signal CTRL. The control signal generator 1040 outputs the data control signal DCS to be provided to the data driving circuit 200. The control signal generator 1040 outputs the scan control signal SCS to be provided to the scan driving circuit 300.

Figure 18:
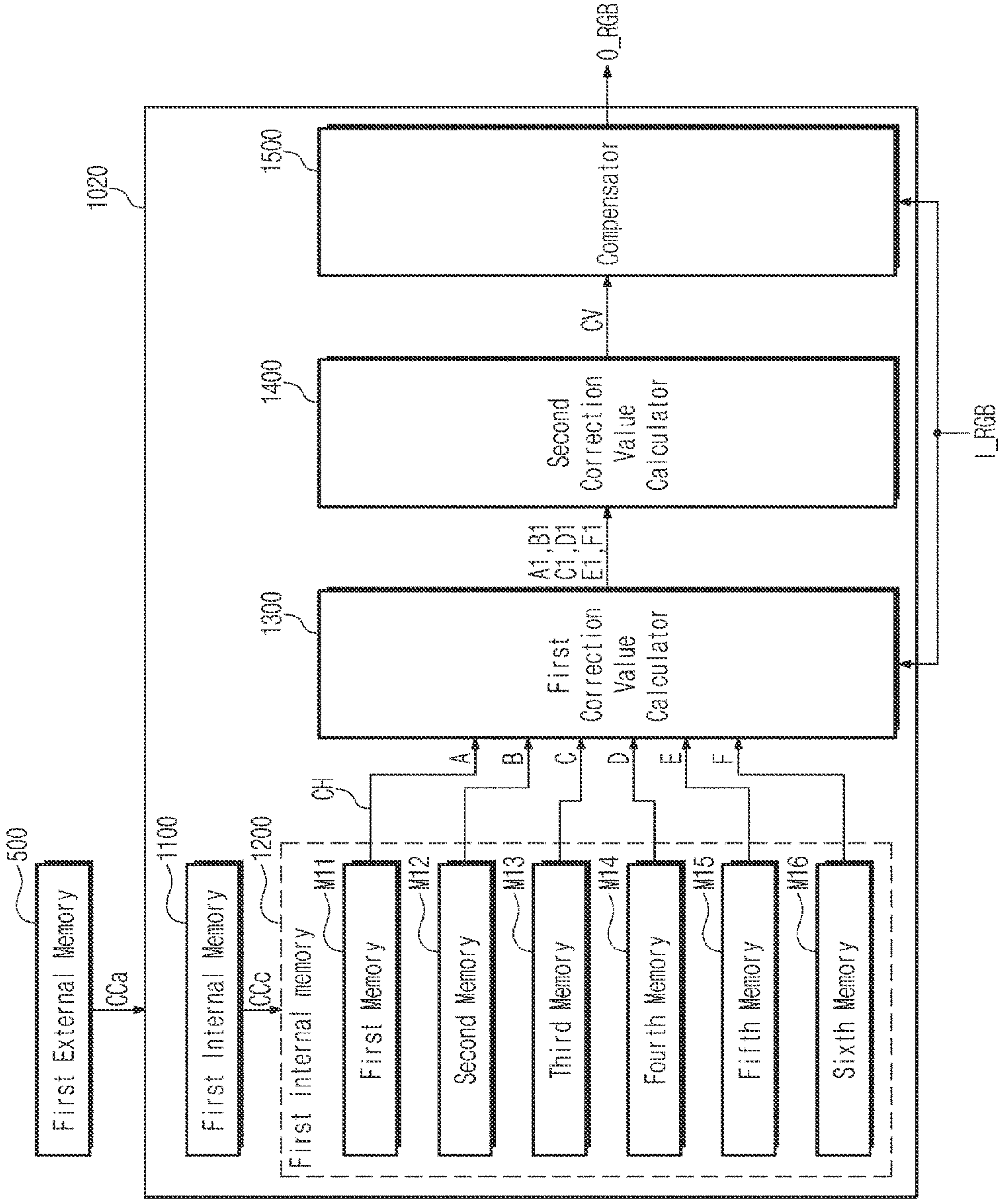
FIG. 18 is a block diagram of an image processor according to an embodiment of the present disclosure.

FIG. 18 is a block diagram of the image processor 1020 according to an embodiment of the present disclosure.

Referring to FIG. 18, the image processor 1020 includes a first internal memory 1100, a second internal memory 1200, and a compensation unit.

The compensation signal CCa stored in the first external memory 500 may be stored in the first internal memory 1100 as an internal compensation signal CCc.

The second internal memory 1200 includes first to sixth memories M11, M12, M13, M14, M15, and M16. The internal compensation signal CCc provided from the first internal memory 1100 may be stored in the first to sixth memories M11, M12, M13, M14, M15, and M16.

In an embodiment, the first external memory 500 may be a nonvolatile memory (e.g., a flash memory), and each of the first internal memory 1100 and the second internal memory 1200 may be a volatile memory (e.g., an SRAM or a DRAM). In an embodiment, each of the first to sixth memories M11, M12, M13, M14, M15, and M16 of the second internal memory 1200 may be implemented with a register.

For better understanding of the embodiment, it is assumed that the internal compensation signal CCc provided from the first internal memory 1100 is the same as the compensation signal CCb illustrated in FIG. 5. That is, the internal compensation signal CCc includes the 11-th to 67-th compensation signals C11 to C67. The 11-th to 67-th compensation signals C11 to C67 respectively correspond to the 11-th to 67-th blocks BK11 to BK67 of the display panel DP illustrated in FIG. 4B.

The first to sixth memories M11, M12, M13, M14, M15, and M16 are physically independent of each other. That is, the first to sixth memories M11, M12, M13, M14, M15, and M16 may be accessed at the same time.

The compensation unit compensates for the input image signal I_RGB based on first to sixth compensation signals A, B, C, D, E, and F read from the first to sixth memories M11, M12, M13, M14, M15, and M16 and outputs the output image signal O_RGB. The compensation unit includes a first correction value calculator 1300, a second correction value calculator 1400, and a compensator 1500.

The first correction value calculator 1300 reads the first to sixth compensation signals A, B, C, D, E, and F from the first to sixth memories M11, M12, M13, M14, M15, and M16. The first correction value calculator 1300 outputs first to sixth correction signals A1, B1, C1, D1, E1, and F1 corresponding to the input image signal I_RGB based on the first to sixth compensation signals A, B, C, D, E, and F.

The second correction value calculator 1400 outputs the final correction signal CV based on the first to sixth correction signals A1, B1, C1, D1, E1, and F1.

The compensator 1500 compensates for the input image signal I_RGB based on the final correction signal CV and outputs the output image signal O_RGB.

For convenience of description, an example in which the number of channels CH between the second internal memory 1200 and the first correction value calculator 1300 is 6 is illustrated in FIG. 18, but the present disclosure is not limited thereto.

For example, the number of channels CH between the second internal memory 1200 and the first correction value calculator 1300 may be 4. The first correction value calculator 1300 may receive compensation signals from 4 memories among the first to sixth memories M11, M12, M13, M14, M15, and M16 and may output 4 correction signals corresponding the input image signal I_RGB based on the 4 compensation signals. This will be described in detail later.

FIGS. 19A to 19F are diagrams illustrating read and write operations of the first to sixth memories M11, M12, M13, M14, M15, and M16.

Referring to FIGS. 4A, 5, 18, and 19A, the 11-th, 12-th, and 13-th compensation signals C11, C12, and C13 corresponding to the 11-th, 12-th, and 13-th blocks BK11, BK12, and BK13 disposed at the first row of the display panel DP are stored in the first, third, and fifth memories M11, M13, and M15. The 21-th, 22-th, and 23-th compensation signals C21, C22, and C23 corresponding to the 21-th, 22-th, and 23-th blocks BK21, BK22, and BK23 disposed at the second row of the display panel DP are stored in the second, fourth, and sixth memories M12, M14, and M16.

As illustrated in FIG. 9, to calculate the compensation signal "c" corresponding to the pixel location XY, the first correction value calculator 1300 may simultaneously read the 11-th, 21-th, 12-th, and 22-th compensation signals C11, C21, C12, and C22 from the first to fourth memories M11, M12, M13, and M14 as the first to fourth compensation signals A, B, C, and D. While the first correction value calculator 1300 reads the 11-th, 21-th, 12-th, and 22-th compensation signals C11, C21, C12, and C22 from the first to fourth memories M11, M12, M13, and M14, the 13-th and 23th compensation signals C13 and C23 of the internal compensation signal CCc stored in the first internal memory 1100 are stored in the fifth and sixth memories M15 and M16.

The first correction value calculator 1300 outputs the first to fourth correction signals A1, B1, C1, and D1 corresponding to the input image signal I_RGB based on the first to fourth compensation signals A, B, C, and D.

The second correction value calculator 1400 calculates the compensation signal "c" corresponding to the pixel location XY, which is placed between the 11-th, 12-th, 21-th, and 22-th blocks BK11, BK12, BK21, and BK22 with respect to the center of each of the 11-th, 12-th, 21-th, and 22-th blocks BK11, BK12, BK21, and BK22, based on the first to fourth correction signals A1, B1, C1, and D1.

The second correction value calculator 1400 calculates the compensation signal "a" based on the first and third correction signals A1 and C1. The second correction value calculator 1400 calculates the compensation signal "b" based on the second and fourth correction signals B1 and D1. The second correction value calculator 130 calculates the compensation signal "c" by Equation 1 above, based on the compensation signal "a" and the compensation signal "b".

As described above, the second correction value calculator 1400 calculates the compensation signal "c" corresponding to the pixel location XY by the bilinear interpolation method, based on the first to fourth correction signals A1, B1, C1, and D1. The second correction value calculator 1400 may output the compensation signal "c" as the final correction signal CV.

Figure 19A:
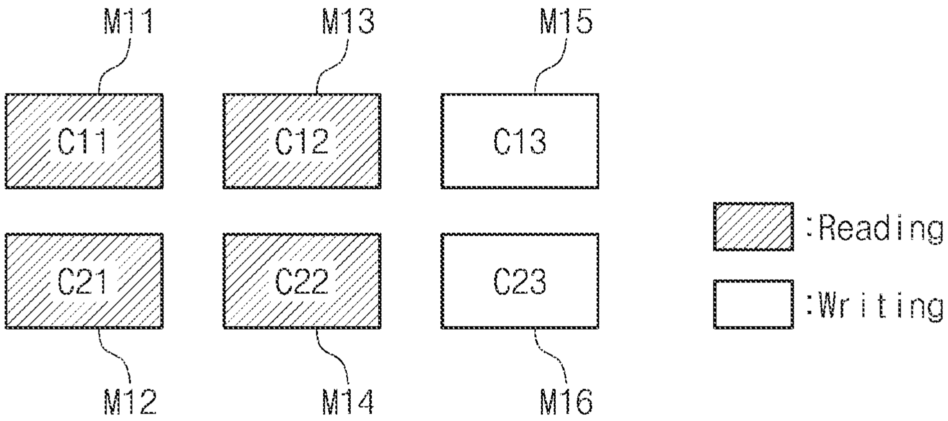
FIGS. 19A, 19B, 19C, 19D, 19E, and 19F are diagrams illustrating read and write operations of first to sixth memories.
Figure 19B:
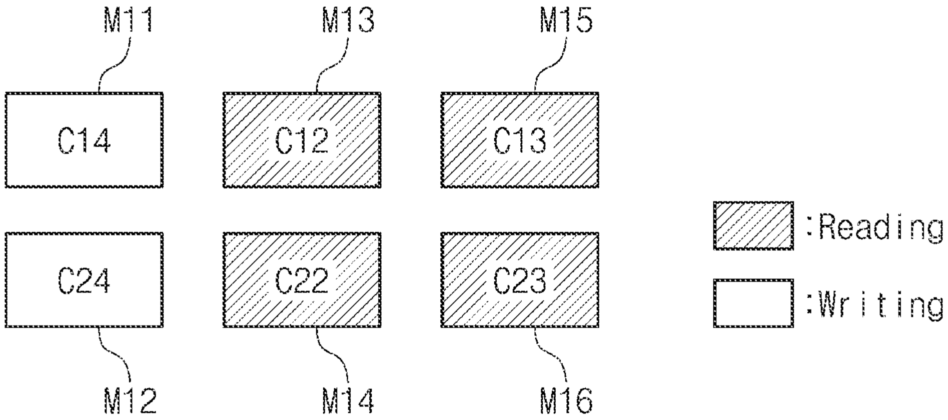

Referring to FIGS. 18 and 19B, the first correction value calculator 1300 may simultaneously read the 12-th, 22-th, 13-th, and 23-th compensation signals C12, C22, C13, and C23 from the third to sixth memories M13, M14, M15, and M16 as the third to sixth compensation signals C, D, E, and F. While the first correction value calculator 1300 reads the third to sixth compensation signals C, D, E, and F from the third to sixth memories M13, M14, M15, and M16, the 14-th and 24-th compensation signals C14 and C24 of the internal compensation signal CCc stored in the first internal memory 1100 are stored in the first and second memories M11 and M12.

The first correction value calculator 1300 outputs third to sixth correction signals C1, D1, E1, and F1 corresponding to the input image signal I_RGB based on the third to sixth compensation signals C, D, E, and F.

The second correction value calculator 1400 calculate the final correction signal CV based on the third to sixth correction signals C1, D1, E1, and F1.

Figure 19C:
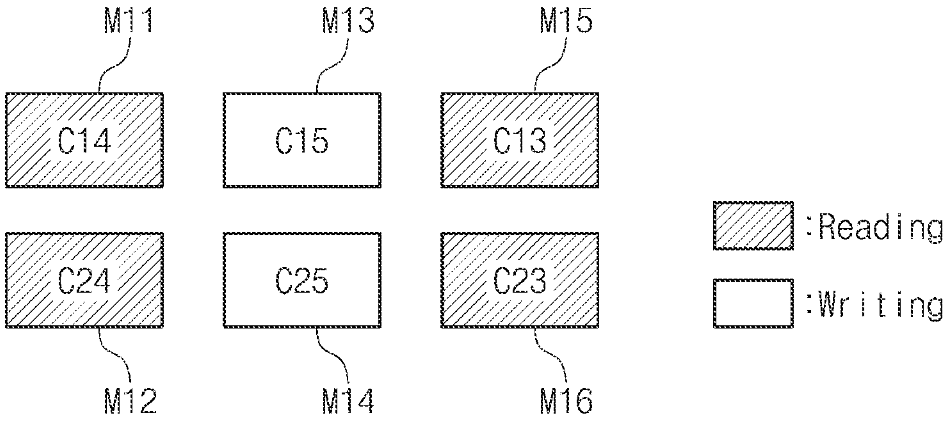

Referring to FIGS. 18 and 19C, the first correction value calculator 1300 may simultaneously read the 13-th, 23-th, 14-th, and 24-th compensation signals C13, C23, C14, and C24 from the fifth, sixth, first, and second memories M15, M16, M11, and M12 as the fifth, sixth, first, and second compensation signals E, F, A, and B. While the first correction value calculator 1300 reads the 13-th, 23-th, 14-th, and 24-th compensation signals C13, C23, C14, and C24 from the fifth, sixth, first, and second memories M15, M16, M11, and M12, the 15-th and 25-th compensation signals C15 and C25 of the internal compensation signal CCc stored in the first internal memory 1100 are stored in the third and fourth memories M13 and M14.

The first correction value calculator 1300 outputs the fifth, sixth, first, and second correction signals E1, F1, A1, and B1 corresponding to the input image signal I_RGB based on the fifth, sixth, first, and second compensation signals E, F, A, and B.

The second correction value calculator 1400 calculate the final correction signal CV based on the fifth, sixth, first, and second correction signals E1, F1, A1, and B1.

Figure 19D:
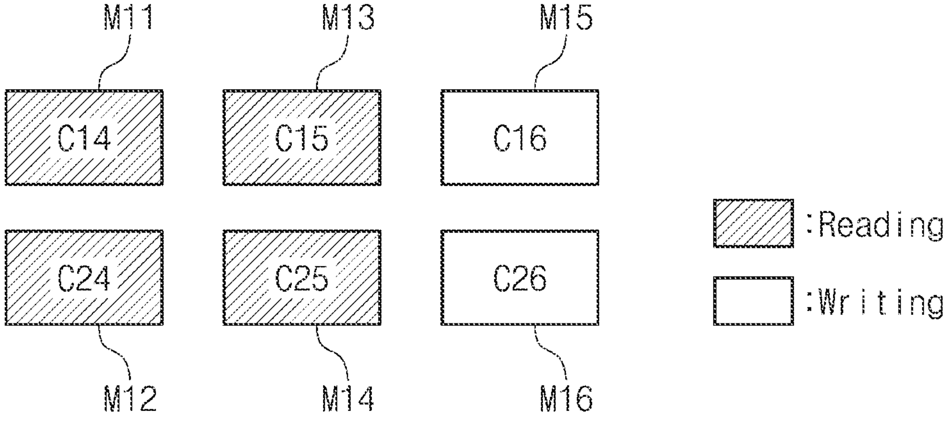

Referring to FIGS. 18 and 19D, the first correction value calculator 1300 may simultaneously read the 14-th, 24-th, 15-th, and 25-th compensation signals C14, C24, C15, and C25 from the first to fourth memories M11, M12, M13, and M14 as the first to fourth compensation signals A, B, C, and D. While the first correction value calculator 1300 reads the 14-th, 24-th, 15-th, and 25-th compensation signals C14, C24, C15, and C25 from the first to fourth memories M11, M12, M13, and M14, the 16-th and 26-th compensation signals C16 and C26 of the internal compensation signal CCc stored in the first internal memory 1100 are stored in the fifth and sixth memories M15 and M16.

The first correction value calculator 1300 outputs the first to fourth correction signals A1, B1, C1, and D1 corresponding to the input image signal I_RGB based on the first to fourth compensation signals A, B, C, and D.

The second correction value calculator 1400 calculates the final correction signal CV based on the first to fourth correction signals A1, B1, C1, and D1.

Figure 19E:
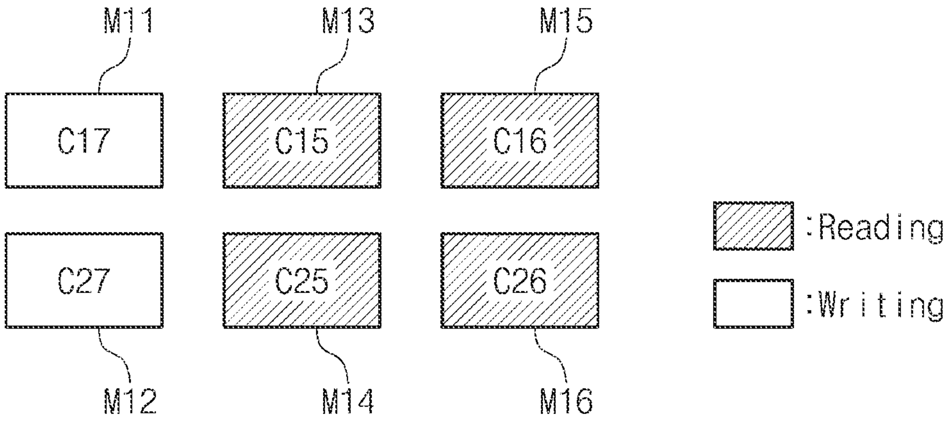

Referring to FIGS. 18 and 19E, the first correction value calculator 1300 may simultaneously read the 15-th, 25-th, 16-th, and 26-th compensation signals C15, C25, C16, and C26 from the third to sixth memories M13, M14, M15, and M16 as the third to sixth compensation signals C, D, E, and F. While the first correction value calculator 1300 reads the third to sixth compensation signals C, D, E, and F from the third to sixth memories M13, M14, M15, and M16, the 17-th and 27-th compensation signals C17 and C27 of the internal compensation signal CCc stored in the first internal memory 1100 are stored in the first and second memories M11 and M12.

The first correction value calculator 1300 outputs third to sixth correction signals C1, D1, E1, and F1 corresponding to the input image signal I_RGB based on the third to sixth compensation signals C, D, E, and F.

The second correction value calculator 1400 calculate the final correction signal CV based on the third to sixth correction signals C1, D1, E1, and F1.

Figure 19F:
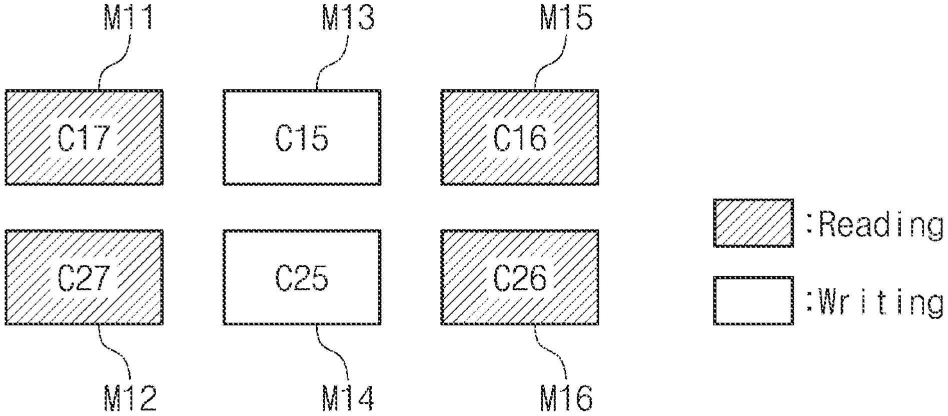

Referring to FIGS. 18 and 19F, the first correction value calculator 1300 may simultaneously read the 16-th, 26-th, 17-th, and 27-th compensation signals C16, C26, C17, and C27 from the fifth, sixth, first, and second memories M15, M16, M11, and M12 as the fifth, sixth, first, and second compensation signals E, F, A, and B.

The first correction value calculator 1300 outputs the fifth, sixth, first, and second correction signals E1, F1, A1, and B1 corresponding to the input image signal I_RGB based on the fifth, sixth, first, and second compensation signals E, F, A, and B.

The second correction value calculator 1400 calculate the final correction signal CV based on the fifth, sixth, first, and second correction signals E1, F1, A1, and B1.

The image processor 1020 may sequentially store the internal compensation signal CCc stored in the first internal memory 1100 in the first to sixth memories M11 to M16 in the method described with reference to FIGS. 19A to 19F. Also, in the method described with reference to FIGS. 19A to 19F, the image processor 1020 may sequentially read all the 11-th to 67-th compensation signals C11 to C67 illustrated in FIG. 5 from the first to sixth memories M11 to M16 and may output the output image signal O_RGB.

Figure 20:
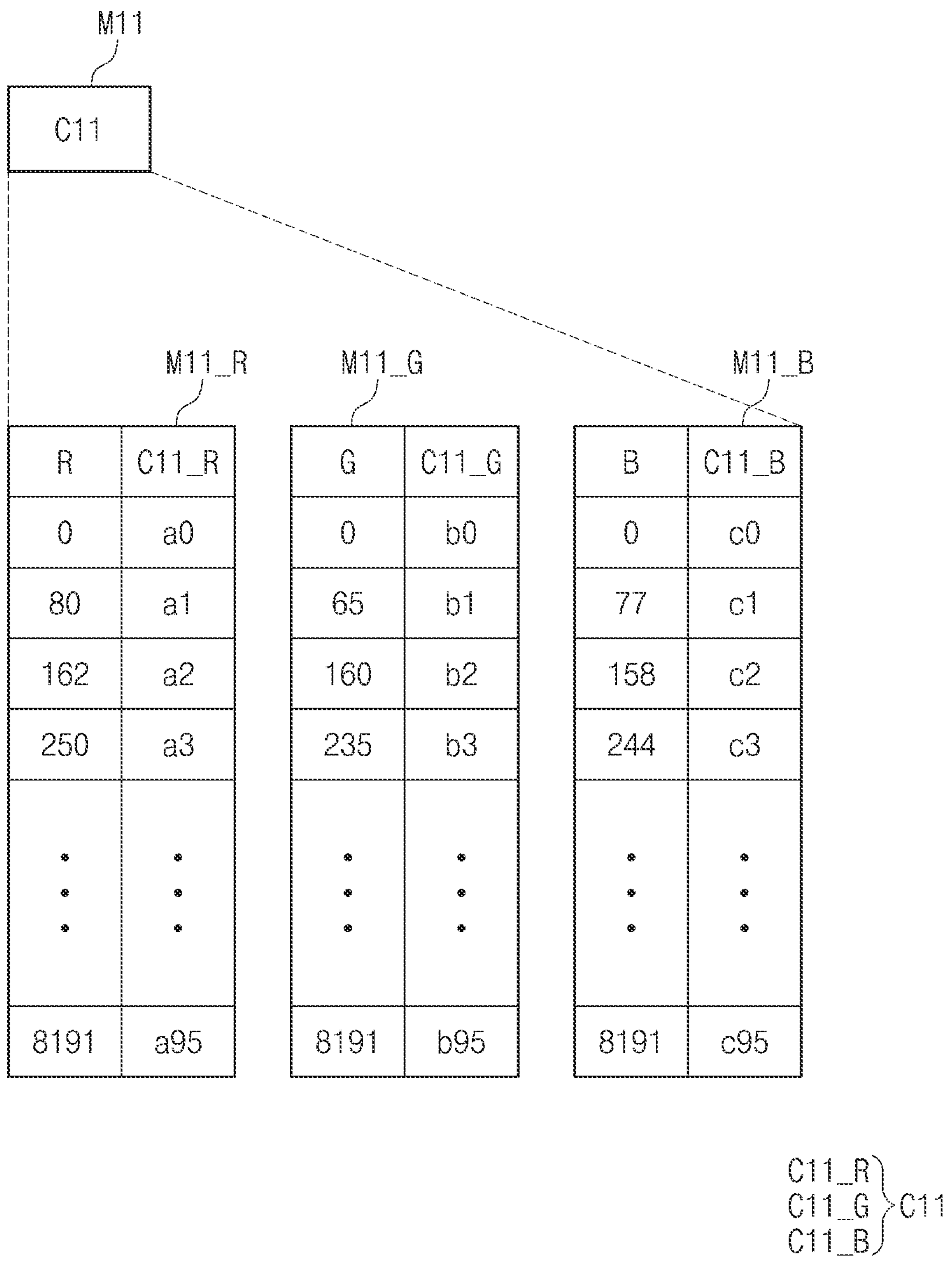
FIG. 20 is a diagram illustrating a structure of a first memory according to an embodiment of the present disclosure.

FIG. 20 is a diagram illustrating a structure of the first memory M11 according to an embodiment of the present disclosure.

Referring to FIG. 20, the first memory M11 includes a first sub-memory M11_R, a second sub-memory M11_G, and a third sub-memory M11_B.

The 11-th compensation signal C11 stored in the first memory M11 includes the first compensation value C11_R for the first image signal "R", the second compensation value C11_G for the second image signal "G", and the third compensation value C11_B for the third image signal "B".

The first sub-memory M11_R stores the first compensation value C11_R for the first image signal "R". The second sub-memory M11_G stores the second compensation value C11_G for the second image signal "G". The third sub-memory M11_B stores the third compensation value C11_B for the third image signal "B".

In an embodiment, the first compensation value C11_R, the second compensation value C11_G, and the third compensation value C11_B may be the same as those illustrated in FIG. 6 as an example.

Each of the 13-th, 15-th, and 17-th compensation signals C13, C15, and C17 stored in the first memory M11 may include first to third compensation signals that are similar to those of the 11-th compensation signal C11.

Figure 21:
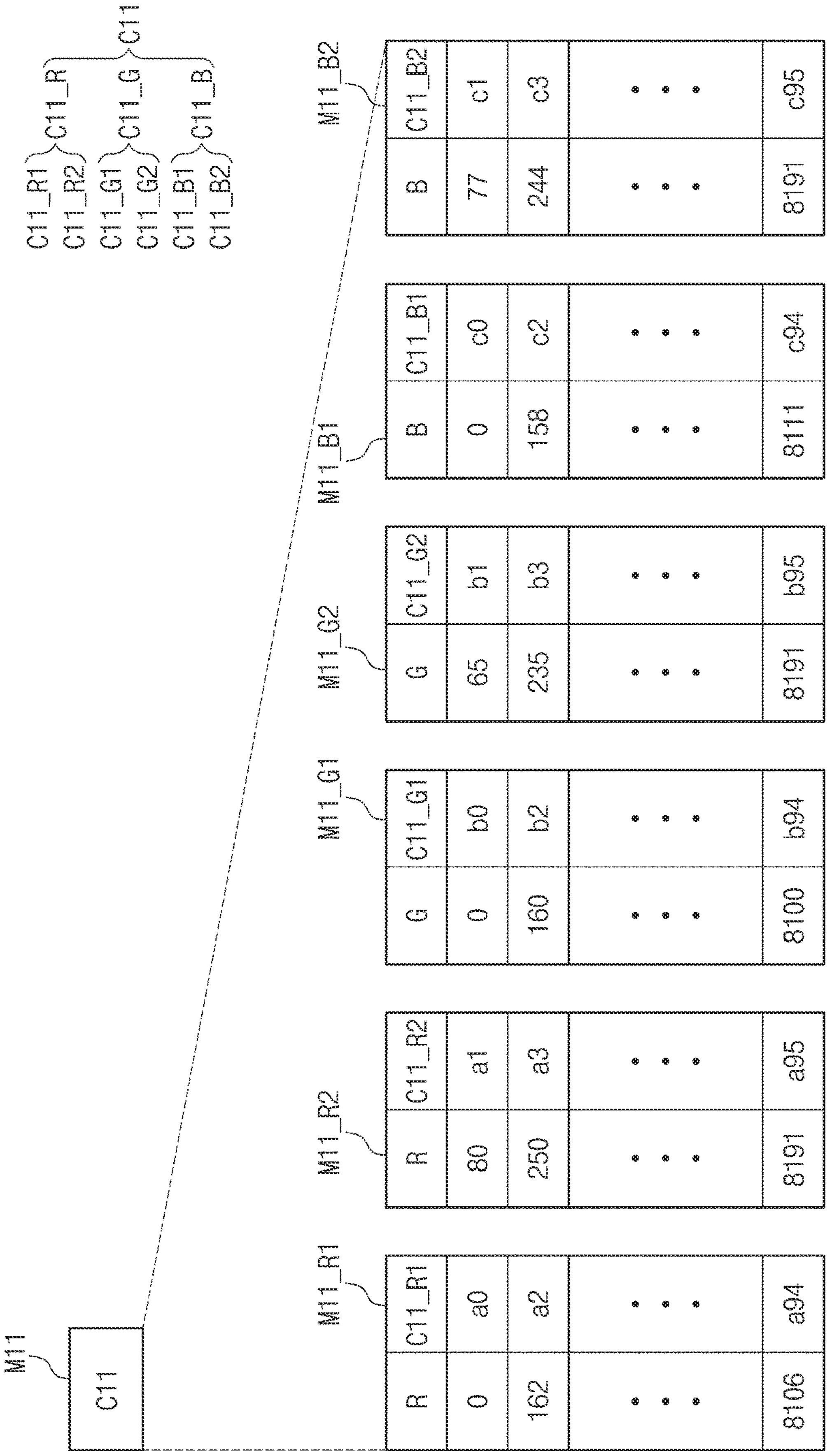
FIG. 21 is a diagram illustrating a structure of a first memory according to an embodiment of the present disclosure.

FIG. 21 is a diagram illustrating a structure of the first memory M11 according to an embodiment of the present disclosure.

Referring to FIG. 21, the first memory M11 includes the first to sixth sub-memories M11_R1, M1_R2, M11_G1, M1_G2, M11_B1, and M11_B2.

The 11-th compensation signal C11 stored in the first memory M11 includes the first compensation value C11_R for the first image signal "R", the second compensation value C11_G for the second image signal "G", and the third compensation value C11_B for the third image signal "B".

The first compensation value C11_R may include a first sub-compensation value C11_R1 and a second sub-compensation value C11_R2. The first sub-memory M11_R1 stores the first sub-compensation value C11_R1. The second sub-memory M11_R2 stores the second sub-compensation value C11_R2.

The first sub-compensation value C11_R1 includes the odd-numbered compensation values a0, a2, . . . , a94 of the first compensation value C11_R. The second sub-compensation value C11_R2 includes the even-numbered compensation values a1, a3, . . . , a95 of the first compensation value C11_R.

The second compensation value C11_G may include a third sub-compensation value C11_G1 and a fourth sub-compensation value C11_G2. The third sub-memory M11_G1 stores the third sub-compensation value C11_G1. The fourth sub-memory M11_G2 stores the fourth sub-compensation value C11_G2.

The third sub-compensation value C11_G1 includes the odd-numbered compensation values b0, b2, . . . , b94 of the second compensation value C11_G. The fourth sub-compensation value C11_G2 includes the even-numbered compensation values b1, b3, . . . , b95 of the second compensation value C11_G.

The third compensation value C11_B may include a fifth sub-compensation value C11_B1 and a sixth sub-compensation value C11_B2. The fifth sub-memory M11_B1 stores the fifth sub-compensation value C11_B1. The sixth sub-memory M11_B2 stores the sixth sub-compensation value C11_B2.

The fifth sub-compensation value C11_B1 stores the odd-numbered compensation values c0, c2, . . . , c94 of the third compensation value C11_B. The sixth sub-compensation value C11_B2 stores the even-numbered compensation values c1, c3, . . . , c95 of the third compensation value C11_B.

When the gray level of the first image signal "R" included in the input image signal I_RGB is 150, the first correction value calculator 1300 illustrated in FIG. 18 may calculate a compensation value corresponding to the gray level (i.e., 150) of the first image signal "R", based on the compensation value a1 corresponding to the 80 gray level and the compensation value a2 corresponding to the 162 gray level.

The compensation value a1 corresponding to the 80 gray level is stored in the second sub-memory M11_R2, and the compensation value a2 corresponding to the 162 gray level is stored in the first sub-memory M11_R1. Therefore, the first correction value calculator 1300 may simultaneously read the compensation values a1 and a2 from the first sub-memory M11_R1 and the second sub-memory M11_R2. This may mean that the operating speed of the first correction value calculator 1300 is prevented from being reduced.

In an embodiment, each of the second to sixth memories M12 to M16 illustrated in FIG. 18 may include the same configurations as the first to sixth sub-memories M11_R1, M11_R2, M11_G1, M1_G2, M11_B1, and M11_B2 of the first memory M11 illustrated in FIG. 21.

Figure 22:
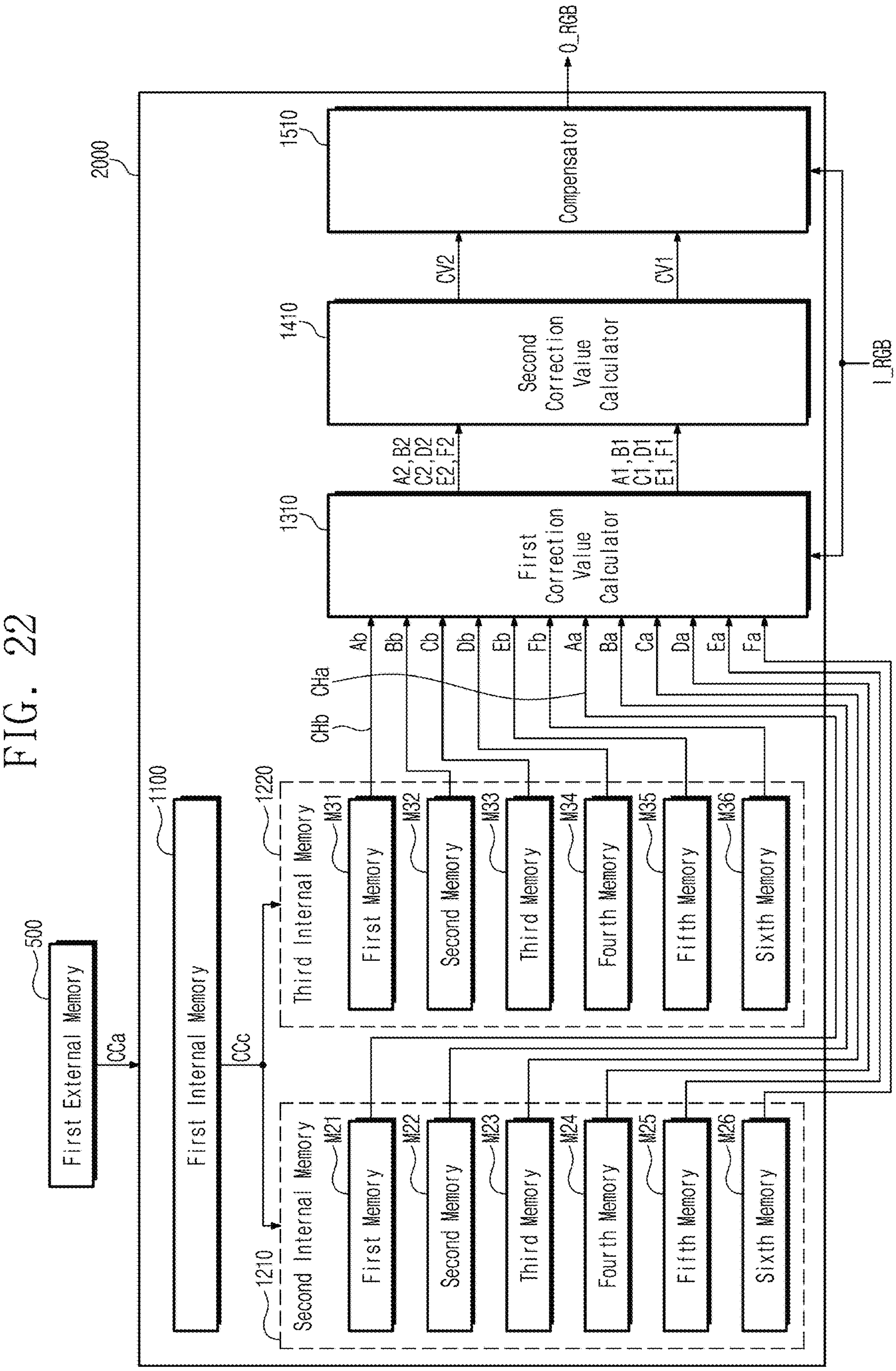
FIG. 22 is a block diagram of an image processor according to an embodiment of the present disclosure.

FIG. 22 is a block diagram of an image processor 2000 according to an embodiment of the present disclosure.

Referring to FIG. 22, the image processor 2000 includes the first internal memory 1100, a second internal memory 1210, a third internal memory 1220, and a compensation unit. The compensation unit includes a first correction value calculator 1310, a second correction value calculator 1410, and a compensator 1510.

The compensation signal CCa provided from the first external memory 500 may be stored in the first internal memory 1100.

The second internal memory 1210 includes first to sixth memories M21, M22, M23, M24, M25, and M26. Some of compensation signals included in the internal compensation signal CCc provided from the first internal memory 1100 may be stored in the first to sixth memories M21, M22, M23, M24, M25, and M26.

The third internal memory 1220 includes first to sixth memories M31, M32, M33, M34, M35, and M36. Some of the compensation signals included in the internal compensation signal CCc provided from the first internal memory 1100 may be stored in the first to sixth memories M31, M32, M33, M34, M35, and M36.

The first to sixth memories M21, M22, M23, M24, M25, and M26 of the second internal memory 1210 and the first to sixth memories M31, M32, M33, M34, M35, and M36 of the third internal memory 1220 are physically independent of each other. That is, the first to sixth memories M21, M22, M23, M24, M25, and M26 of the second internal memory 1210 and the first to sixth memories M31, M32, M33, M34, M35, and M36 of the third internal memory 1220 may be simultaneously accessed.

The first correction value calculator 1310 outputs first to sixth correction signals A1, B1, C1, D1, E1, and F1 corresponding to the input image signal I_RGB based on first to sixth compensation signals Aa, Ba, Ca, Da, Ea, and Fa read from the first to sixth memories M21, M22, M23, M24, M25, and M26 of the second internal memory 1210.

The first correction value calculator 1310 outputs first to sixth correction signals A2, B2, C2, D2, E2, and F2 corresponding to the input image signal I_RGB based on first to sixth compensation signals Ab, Bb, Cb, Db, Eb, and Fb read from the first to sixth memories M31, M32, M33, M34, M35, and M36 of the third internal memory 1220.

The second correction value calculator 1410 outputs a final correction signal CV1 based on the first to sixth correction signals A1, B1, C1, D1, E1, and F1 and output a final correction signal CV2 based on the first to sixth correction signals A2, B2, C2, D2, E2, and F2.

The compensator 1510 compensates for the input image signal I_RGB based on the final correction signals CV1 and CV2 and outputs the output image signal O_RGB.

Figure 23A:
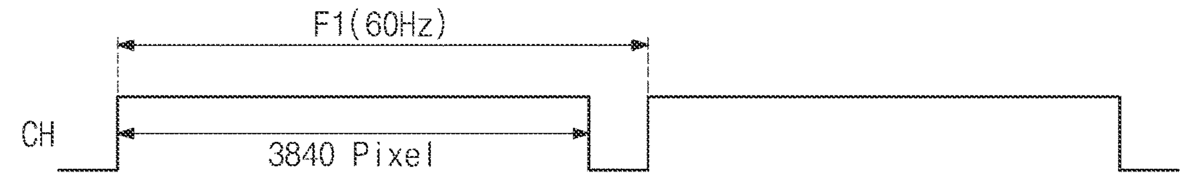
FIG. 23A is a diagram illustrating an operation timing of a channel between a first memory and a first correction value calculator illustrated in FIG. 18.

FIG. 23A is a diagram illustrating an operation timing of the channel CH between the first memory M11 and the first correction value calculator 1300 illustrated in FIG. 18.

Figure 23B:
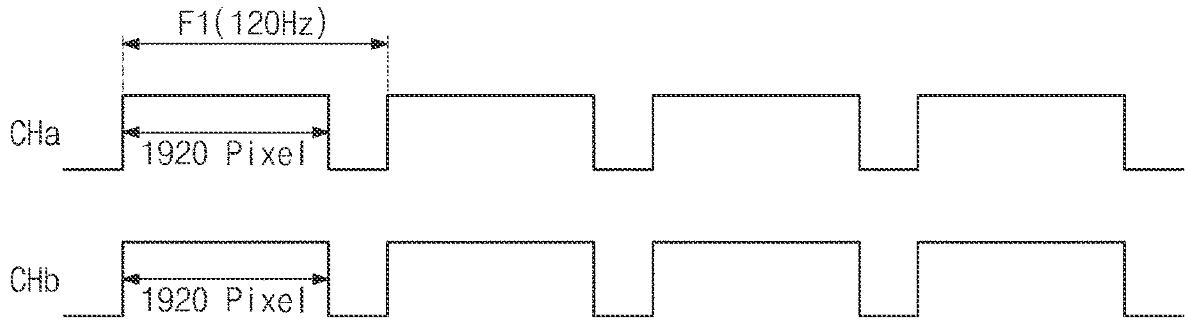
FIG. 23B is a diagram illustrating an operation timing of a channel between a first memory and a first correction value calculator illustrated in FIG. 22 and a channel between a first memory and a first correction value calculator illustrated in FIG. 22.

FIG. 23B is a diagram illustrating an operation timing of a channel CHa between the first memory M21 and the first correction value calculator 1310 illustrated in FIG. 22 and a channel CHb between the first memory M31 and the first correction value calculator 1310 illustrated in FIG. 22.

In the following description, it is assumed that the number of pixels PX disposed at one row of the display panel DP illustrated in FIG. 16, that is, the number of pixels PX disposed at the same row in the first direction DR1 is 3,840.

Referring to FIGS. 18 and 23A, when the driving frequency of the image processor 1020 is 60 Hz, the first compensation signal "A" corresponding to 3,840 pixels may be transferred through the channel CH during one frame F1.

Referring to FIGS. 22 and 23B, when the driving frequency of the image processor 2000 is 120 Hz, a first compensation signal Aa corresponding to 1,920 pixels may be transferred through the channel CHa during one frame F1. Also, a first compensation signal Ab corresponding to 1,920 pixels may be transferred through the channel CHb during one frame F1.

The image processor 2000 may include the second internal memory 1210 and the third internal memory 1220 and may simultaneously access the second internal memory 1210 and the third internal memory 1220.

Therefore, even though the driving frequency of the image processor 2000 is high, a time necessary to transfer the first compensation signal Aa and the first compensation signal Ab through the channels CHa and CHb may be sufficiently secured.

In an embodiment, when the image processor 2000 illustrated in FIG. 22 includes a fourth internal memory as well as the second internal memory 1210 and the third internal memory 1220, the first compensation value C11_R for the first image signal "R" illustrated in FIG. 20 may be stored in the second internal memory 1210, the second compensation value C11_G for the second image signal "G" illustrated in FIG. 20 may be stored in the third internal memory 1220, and the third compensation value C11_B for the third image signal "B" illustrated in FIG. 20 may be stored in the fourth internal memory.

That is, as the compensation values for the first image signal "R", the second image signal "G", and the third image signal "B" are distributed and stored in the second to fourth internal memories, even though the driving frequency of the image processor 2000 is high, a time necessary to transfer signals through channels between the second to fourth internal memories and the first correction value calculator 1310 may be sufficiently secured. This may mean that the reliability of operation is improved even though the driving frequency of the display device DDa (refer to FIG. 16) is high.

Figure 24A:
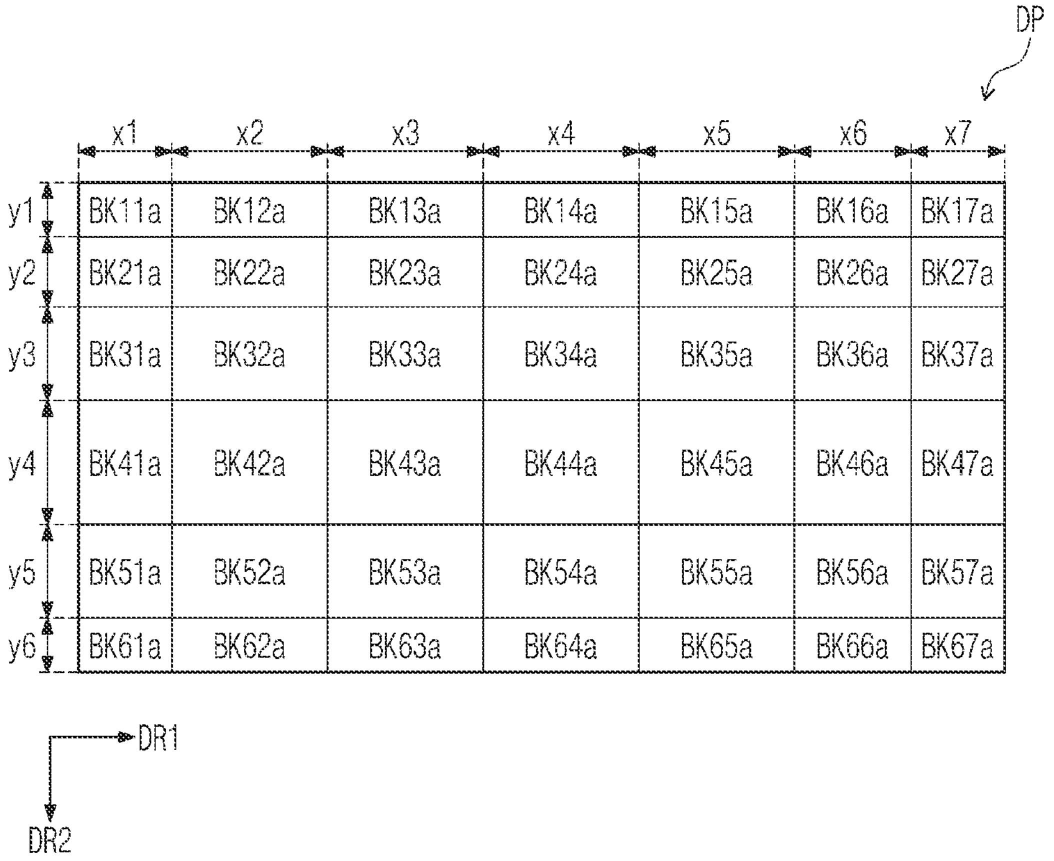
FIGS. 24A and 24B are diagrams for describing a method of obtaining a compensation signal by sensing a characteristic of a display panel.
Figure 24B:
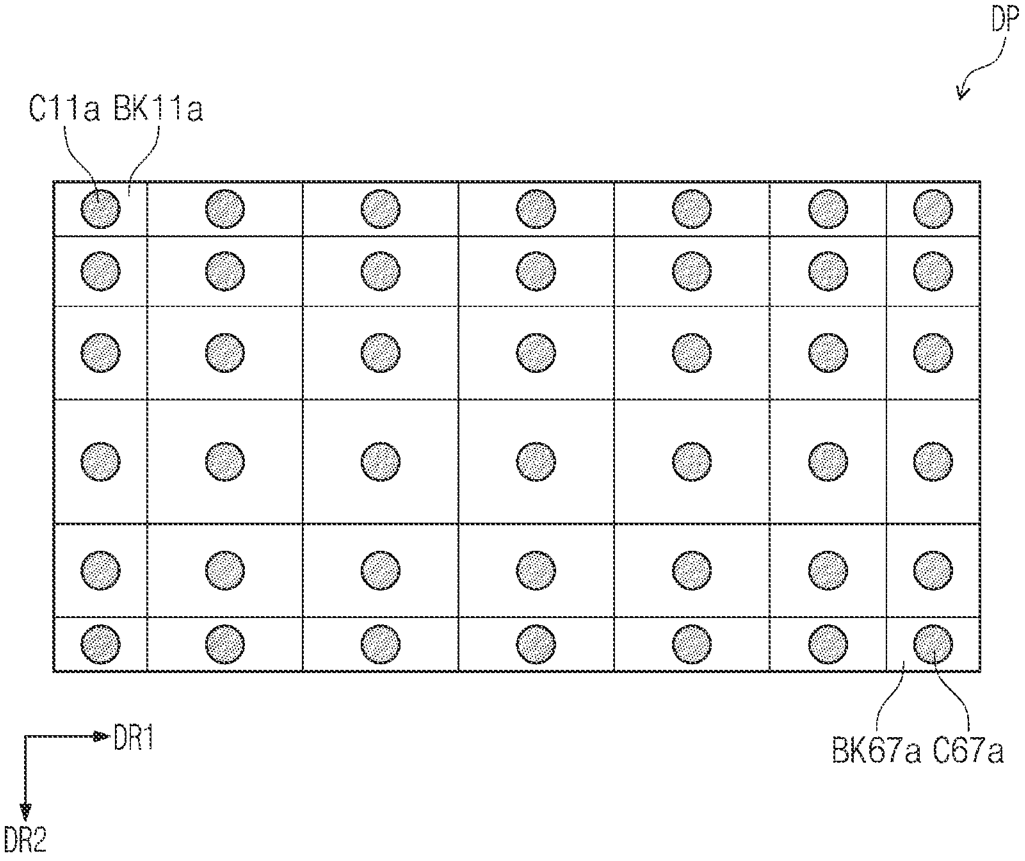

FIGS. 24A and 24B are diagrams for describing a method of obtaining a compensation signal by sensing a characteristic of the display panel DP.

Referring to FIG. 24A, the display panel DP may be divided into a plurality of blocks. For example, the display panel DP may be divided into 42 blocks (hereinafter marked by BK11*a* to BK67*a*). In detail, 7 blocks may be arranged in the first direction DR1 for each row, and 6 blocks may be arranged in the second direction DR2 for each column (i.e., the display panel DP may be divided into 42 blocks arranged in a matrix of dimensions 6×7).

An imaging device such as a camera (not illustrated) captures the display panel DP in a state where a given test image is displayed in the display panel DP. In an embodiment, 42 cameras may respectively capture the 11-th to 67-th blocks BK11*a* to BK67*a*. Luminance of each of the 11-th to 67-th blocks BK11*a* to BK67*a* may be sensed based on the image obtained by each of the 42 cameras.

Lengths y1, y2, y3, y4, y5, and y6 of the first to sixth rows of the 11-th to 67-th blocks BK11*a* to BK67*a* of the display panel DP illustrated in FIG. 24A may be different from each other. Lengths x1, x2, x3, x4, x5, x6, and x7 of the first to seventh columns of the 11-th to 67-th blocks BK11*a* to BK67*a* of the display panel DP may be different from each other.

In an embodiment, the lengths y1, y2, y3, y4, y5, and y6 of the first to sixth rows and the lengths x1, x2, x3, x4, x5, x6, and x7 of the first to seventh columns may be determined depending on the characteristic of the display panel DP.

Referring to FIG. 24B, the test device (not illustrated) may generate 11-th to 67-th compensation signals C11*a* to C67*a* for the 11-th to 67-th blocks BK11*a* to BK67*a* based on the image displayed in the 11-th to 67-th blocks BK11*a* to BK67*a* and the luminance sensed by each of the 42 cameras. The 11-th to 67-th compensation signals C11*a* to C67*a* may respectively correspond to representative values for the 11-th to 67-th blocks BK11*a* to BK67*a*. In FIG. 24B, the 11-th to 67-th compensation signals C11*a* to C67*a* are marked by a circle for easy understanding of a one-to-one correspondence between the 11-th to 67-th compensation signals C11*a* to C67*a* and the 11-th to 67-th blocks BK11*a* to BK67*a*. Also, it is assumed that each of the 11-th to 67-th compensation signals C11*a* to C67*a* corresponds to a center pixel located at the center of each of the 11-th to 67-th blocks BK11*a* to BK67*a*.

In an embodiment, the test device (not illustrated) may provide the display panel DP with a data signal corresponding to each of the first image signal "R", the second image signal "G", and the third image signal "B" and may obtain the characteristic of the display panel DP as illustrated in FIG. 3.

The 11-th to 67-th compensation signals C11*a* to C67*a* are stored in the first external memory 500 (refer to FIG. 2). That is, the compensation signal CCa stored in the first external memory 500 may include the 11-th to 67-th compensation signals C11*a* to C67*a* respectively corresponding to the 11-th to 67-th blocks BK11*a* to BK67*a* of the display panel DP. The compensation signal CCa stored in the first external memory 500 may be stored in the second external memory 600 by the driving controller 100.

As described with reference to FIG. 9, the compensation signal "c" corresponding to the pixel location XY of the display panel DP may be calculated by the bilinear interpolation method. As the lengths y1, y2, y3, y4, y5, and y6 of the first to sixth rows of the 11-th to 67-th blocks BK11*a* to BK67*a* and the lengths x1, x2, x3, x4, x5, x6, and x7 of the first to seventh columns thereof are set depending on the characteristic of the display panel DP, the compensation signal "c" may be calculated to be appropriate for the characteristic of each of the 11-th to 67-th blocks BK11*a* to BK67*a*.

A driving controller of a display device with the above configuration includes first to fourth memories for storing a plurality of compensation signals stored in a memory. The driving controller stores only some of the plurality of compensation signals stored in the memory in the first to fourth memories. Therefore, the size of the first to fourth memories in the driving controller may be minimized, and power consumption of the display device may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel;

a memory configured to store a plurality of compensation signals respectively corresponding to a plurality of blocks of the display panel; and a driving controller configured to receive an input image signal, to compensate for the input image signal based on the plurality of compensation signals, and to output an output image signal, wherein the driving controller includes:

a first to a fourth memory configured to store the plurality of compensation signals from the memory; and a compensation unit configured to compensate for the input image signal based on first to fourth compensation signals respectively provided from the first to fourth memories and to output the output image signal, wherein the plurality of compensation signals stored in the memory include first row compensation signals corresponding to blocks disposed at a first row from among the plurality of blocks and second row compensation signals corresponding to blocks disposed at a second row from among the plurality of blocks, and wherein some of the first row compensation signals are stored in the first memory, the others of the first row compensation signals are stored in the second memory, some of the second row compensation signals are stored in the third memory, and the others of the second row compensation signals are stored in the fourth memory.

2. The display device of claim 1, wherein the compensation unit simultaneously reads the first to fourth compensation signals from the first to fourth memories.

3. The display device of claim 1, wherein odd-numbered first row compensation signals among the first row compensation signals are stored in the first memory, and even-numbered first row compensation signals among the first row compensation signals are stored in the second memory, and wherein odd-numbered second row compensation signals among the second row compensation signals are stored in the third memory, and even-numbered second row compensation signals among the second row compensation signals are stored in the fourth memory.

4. The display device of claim 1, wherein the compensation unit includes:

a first correction value calculator configured to output first to fourth correction signals corresponding to the input image signal based on the first to fourth compensation signals;

a second correction value calculator configured to output a final compensation signal based on the first to fourth correction signals; and a compensator configured to compensate for the input image signal based on the final compensation signal and to output the output image signal.

5. The display device of claim 4, wherein the second correction value calculator outputs the final compensation signal by a bilinear interpolation method, based on the first to fourth correction signals.

6. The display device of claim 4, wherein each of the first to fourth compensation signals includes first compensation values for a first image signal, second compensation values for a second image signal, and third compensation values for a third image signal.

7. The display device of claim 6, wherein each of the first to fourth memories includes:

a first and a second sub-memory configured to store the first compensation values;

a third and a fourth sub-memory configured to store the second compensation values; and a fifth and a sixth sub-memory configured to store the third compensation values.

8. The display device of claim 7, wherein odd-numbered first compensation values among the first compensation values are stored in the first sub-memory, and wherein even-numbered first compensation values among the first compensation values are stored in the second sub-memory.

9. The display device of claim 8, wherein the first image signal corresponds to a first color, and wherein the first compensation values respectively correspond to a plurality of gray levels of the first color.

10. The display device of claim 9, wherein the first correction value calculator outputs the first correction signal corresponding to the first color of the first image signal based on one of the odd-numbered first compensation values stored in the first sub-memory and one of the even-numbered first compensation values stored in the second sub-memory.

11. The display device of claim 1, wherein a sum of respective sizes of the first to fourth memories is smaller than a size of the memory.

12. A display device comprising:

a display panel;

a memory configured to store a plurality of compensation signals respectively corresponding to a plurality of blocks of the display panel; and a driving controller configured to receive an input image signal, to compensate for the input image signal based on the plurality of compensation signals, and to output an output image signal, wherein the driving controller includes:

a first to a fourth memory configured to store the plurality of compensation signals from the memory;

a first correction value calculator configured to output a first to a fourth correction signal corresponding to the input image signal based on the first to fourth compensation signals from the first to fourth memories;

a second correction value calculator configured to output a final compensation signal based on the first to fourth correction signals; and a compensator configured to compensate for the input image signal based on the final compensation signal and to output the output image signal, wherein the plurality of compensation signals stored in the memory include first row compensation signals corresponding to blocks disposed at a first row from among the plurality of blocks and second row compensation signals corresponding to blocks disposed at a second row from among the plurality of blocks, and wherein some of the first row compensation signals are stored in the first memory, the others of the first row compensation signals are stored in the second memory, some of the second row compensation signals are stored in the third memory, and the others of the second row compensation signals are stored in the fourth memory.

13. The display device of claim 12, wherein odd-numbered first row compensation signals among the first row compensation signals are stored in the first memory, and even-numbered first row compensation signals among the first row compensation signals are stored in the second memory, and wherein odd-numbered second row compensation signals among the second row compensation signals are stored in the third memory, and even-numbered second row compensation signals among the second row compensation signals are stored in the fourth memory.

14. The display device of claim 12, wherein each of the first to fourth compensation signals includes first compensation values for a first image signal, second compensation values for a second image signal, and third compensation values for a third image signal.

15. The display device of claim 14, wherein each of the first to fourth memories includes:

a first and a second sub-memory configured to store the first compensation values;

a third and a fourth sub-memory configured to store the second compensation values; and a fifth and a sixth sub-memory configured to store the third compensation values.

16. The display device of claim 15, wherein odd-numbered first compensation values among the first compensation values are stored in the first sub-memory, and wherein even-numbered first compensation values among the first compensation values are stored in the second sub-memory.

17. A method of operating a display device, the display device including a memory storing a plurality of compensation signals respectively corresponding to a plurality of blocks of a display panel, the method comprising:

storing some of first row compensation signals corresponding to blocks disposed at a first row from among the plurality of blocks in a first memory and storing the others of the first row compensation signals in a second memory;

storing some of second row compensation signals corresponding to blocks disposed at a second row from among the plurality of blocks in a third memory and storing the others of the second row compensation signals in a fourth memory;

receiving an input image signal; and outputting an output image signal by compensating for the input image signal based on first to fourth compensation signals respectively provided from the first to fourth memories.

18. The method of claim 17, wherein odd-numbered first row compensation signals among the first row compensation signals are stored in the first memory, and even-numbered first row compensation signals among the first row compensation signals are stored in the second memory, and wherein odd-numbered second row compensation signals among the second row compensation signals are stored in the third memory, and even-numbered second row compensation signals among the second row compensation signals are stored in the fourth memory.

19. The method of claim 18, wherein a sum of respective sizes of the first to fourth memories is smaller than a size of the memory.

* * * * *